US008620465B2

(12) United States Patent
Van Den Berghe et al.

(10) Patent No.: US 8,620,465 B2
(45) Date of Patent: Dec. 31, 2013

(54) METHOD AND ENCODER FOR COMBINING DIGITAL DATA SETS, A DECODING METHOD AND DECODER FOR SUCH COMBINED DIGITAL DATA SETS AND A RECORD CARRIER FOR STORING SUCH COMBINED DIGITAL DATA SET

(75) Inventors: Guido Van Den Berghe, Sint-Amands (BE); Wilfried Van Baelen, Mol (BE)

(73) Assignee: Auro Technologies, Mol (BE)

( * ) Notice: Subject to any disclaimer, the term of this patent is extended or adjusted under 35 U.S.C. 154(b) by 1078 days.

(21) Appl. No.: 12/445,232

(22) PCT Filed: Oct. 15, 2007

(86) PCT No.: PCT/EP2007/060980
§ 371 (c)(1), (2), (4) Date: Oct. 13, 2009

(87) PCT Pub. No.: WO2008/043858
PCT Pub. Date: Apr. 17, 2008

(65) Prior Publication Data
US 2010/0027819 A1 Feb. 4, 2010

Related U.S. Application Data

(60) Provisional application No. 60/829,321, filed on Oct. 13, 2006.

(51) Int. Cl.
*G06F 17/00* (2006.01)

(52) U.S. Cl.
USPC .................................. 700/94; 381/22; 381/23

(58) Field of Classification Search
USPC ........................................ 700/94; 381/22, 23
See application file for complete search history.

(56) References Cited

FOREIGN PATENT DOCUMENTS

EP 1592008 A2 * 11/2005

* cited by examiner

*Primary Examiner* — Joseph Saunders, Jr.
(74) *Attorney, Agent, or Firm* — Sughrue Mion, PLLC

(57) ABSTRACT

Two digital data sets are combined by equating a first subset of samples to neighboring samples from a second subset which is interleaved with the first subset of samples where the equated samples of the two digital data sets do not correspond in time, and by subsequently adding corresponding samples from both digital data sets. This results in a third digital data set that allows the unraveling of the two digital data sets. The third digital data set, when combining two digital audio streams into a single digital audio stream, is still a good mono representation of the two combined digital audio streams and can thus be reproduced on regular reproduction equipment, yet the use of a decoder according to the invention allows the unraveling of the two digital data sets from the third digital data set.

50 Claims, 14 Drawing Sheets

METHOD AND ENCODER FOR COMBINING DIGITAL DATA SETS, A DECODING METHOD AND DECODER FOR SUCH COMBINED DIGITAL DATA SETS AND A RECORD CARRIER FOR STORING SUCH COMBINED DIGITAL DATA SET

CROSS REFERENCE TO RELATED APPLICATIONS

This application is a National Stage of International Application No. PCT/EP2007/060980 filed Oct. 15, 2007, claiming the benefit of U.S. Patent Application No. 60/829,321, filed Oct. 13, 2006, the contents of all of which are incorporated herein by reference in their entirety.

FIELD OF THE INVENTION

The invention relates to a method for combining a first digital data set of samples with a first size and a second digital data set of samples with a second size into a third digital data set of samples with a third size smaller than a sum of the first size and the second size.

BACKGROUND ART

Such a method is known from EP1592008 where a method for mixing two digital data sets into a third digital data set is disclosed. In order to fit two digital data sets into a single digital data set with a size smaller than the sum of the sizes of the two digital data sets, a reduction of information in the two digital data sets is required. EP1592008 achieves this reduction in defining an interpolation at samples between a first set of predefined positions in the first digital data set and at a non-coinciding set of samples between predefined positions in the second digital data set. The value of the samples between the predefined positions of the digital data sets are set to the interpolation value. After performing this reduction in information in the two digital data sets, each sample of the first digital data set is summed with the corresponding sample of the second digital data set. This results in a third digital data set comprising the summed samples. This summation of samples together with known relationship of the offset between the predefined positions between the first digital data set and the second digital data set allows the recovery of the first digital data set and the second digital data set, albeit only with the interpolated samples between the predefined positions. When the method of EP1592008 is used for audio streams this interpolation is not noticeable and the third digital data set can be played as a mixed representation of the two digital data sets comprised. In order to enable the retrieval of the first and second digital data set with the interpolated samples, a start value for both the first and second digital data set must be know and hence these two values are also stored during mixing to allow a later unraveling of the two digital data sets from the third digital data set.

The method of EP1592008 has the disadvantage that it requires intensive processing on the encoding side.

SUMMARY OF THE INVENTION

It is the objective of the present invention to reduce the processing required on the encoding side.

In order to achieve this objective the method of the present invention comprises the steps of:

- equating a first subset of samples of the first digital data set to neighboring samples of a second subset of samples of the first digital data set where the first subset of samples and the second subset of samples are interleaved,
- equating a third subset of samples of the second digital data set to neighboring samples of a fourth subset of samples of the second digital data set where the third subset of samples and the fourth subset of samples are interleaved,
- creating the samples of the third digital data set by adding the samples of the first digital data set to the in the time domain corresponding samples of the second digital data set,
- embedding a first seed sample of the first digital data set and a second seed sample of the second digital data set in the third digital data set.

By replacing the interpolation step from the method of EP1592008 with a step where the values between the predefined positions are set to the value of an adjacent sample the processing intensity is greatly reduced at the encoding side. The resulting signal still allows the unraveling (i.e. extraction) of the two digital data sets from the third digital data set. The third digital data set, when combining two digital audio streams into a single digital audio stream, is still a good mono representation of the two combined digital audio streams.

The invention is based on the realization that the interpolation is unnecessary on the encoding side since it can equally well be performed on the decoding side as the present method of combining and unraveling leaves the samples of the first and second digital data set at their respective predefined positions intact and retrievable, thus allowing the interpolation of the samples between the intact samples after the decoding of the third digital data set. The third digital data set of the present invention's independent claim differs from the third digital data set of EP1592008 in that typically a larger error exist between a true summation of the first and second digital data sets and the third digital data set in the case of the present invention.

Equating a first subset of samples of the first digital data set to neighboring samples of a second subset of samples of the first digital data set where the first subset of samples and the second subset of samples are interleaved, realizes an easily executed reduction in the information in the first digital data set.

Equating a third subset of samples of the second digital data set to neighboring samples of a fourth subset of samples of the second digital data set where the third subset of samples and the fourth subset of samples are interleaved, realizes an easily executed reduction in the information in the second digital data set.

By making original values from the first and second digital data set available, where the original values can function as a seed value, and assuring that the second and fourth subset are interleaved as well, the first and second digital data sets can be retrieved from the third digital data set in the state where the first subset of samples of the first digital data set were equated to neighboring samples of a second subset of samples of the first digital data set and the third subset of samples of the second digital data set to neighboring samples of a fourth subset of samples of the second digital data set. Once the first and second digital data set have been retrieved in this state, interpolation or filtering can be used to restore as accurately as possible the original values of the first subset of samples of the first digital data stream and the third subset of samples from the second digital data stream. Hence the method combining a first digital data stream and a second digital data stream into a third digital data stream allows the retrieval with high precision of the second and fourth subset of samples and the reconstruction of the first and third subset of values and the step of interpolation can be performed, if required, during decoding.

The end user device comprising the decoder can decide what level of quality the reconstruction achieves since the interpolation can be selected and performed by the decoder instead of being prescribed by the encoder.

By not imposing any interpolation of the first and second digital data set but including an error approximation hidden in the least significant bits of the third digital data stream, an advantage is achieved in that the decoding step is free to choose what reconstruction is to be applied. However, when the error approximation was also used during the composition of the $3^{rd}$ digital set (being the mix of samples from a $1^{st}$ and $2^{nd}$ digital set including the approximated errors), the error approximation values hidden in the least significant bits, have to be used as well during the decoding process in order to perform the reconstruction of the original digital data sets, i.e. original digital audio channels.

The reconstruction during the decoding can be chosen to use the error approximation as stored in the least significant bits and to perform linear interpolation between the samples values at the predefined positions since these are fully retrievable except for the loss of the information in the least significant bits. Thus the coding and decoding system can be used more flexible.

The encoding can either just minimize processing and merge the first and second digital data stream into the third digital data stream without adding the error approximation and just setting the values of the samples between the predetermined positions to the value of adjacent samples, or the error approximation can be selected from a limited set of error approximations and added to the least significant bits of the third digital data set.

In an embodiment of the method the first digital data set represents a first audio signal and the second digital data set represents a second audio signal.

By applying the present invention to audio signals it is not only achieved that the first and second audio signal can be retrieved with an acceptable accuracy but that the resulting combined audio signal as represented by the third digital data set is a perceptibly acceptable representation of the first audio signal when mixed with the second audio signal. It is thus achieved that the resulting third digital data set can be properly reproduced on equipment not capable of extracting the first or second digital audio signal from the third digital data set, while equipment capable of performing the extraction can extract the first and second audio signal for separate reproduction or further processing. When more than two audio signals are combined, i.e. mixed, using this invention, it is also possible to extract only one of the audio signals, leaving the other audio signals combined. These remaining audio signals still yield a reproducible audio signal representing the mix of the still combined audio signals, while the extracted audio signal can be processed by itself.

As a tool to the recording engineers—a real time emulation of the mixing of pairs of audio channels into single channels is possible. This will create and audio output, during record editing as a part of the authoring process, which will represent the minimum guaranteed quality of the final mixing process as well as a minimum quality of the un-mixed or decoded channels. Once a basic set of AURO-phonic multi channel PCM data is created, additional encoding parameters to increase the quality of the mixed signals, may be computed off-line, removing the need for real-time processing.

In a further embodiment of the method the first seed sample is the first sample of the first digital data set and the second seed sample is the second sample of the second digital data set.

Selecting seed samples for the unraveling near the start of the digital data set allows the start of the unraveling of the first and second digital data set to start as soon as the third digital data set is started to be read. The seed samples could also be embedded, i.e. located, further into the third digital data set so that a recursive approach would be needed to unravel the samples located before the seed samples. Selecting seed samples from the original digital data set at, or prior to, the beginning of that set simplifies the unraveling process to retrieve the first and second digital data set.

In a further embodiment of the method the first seed sample and the second seed sample are embedded in lower significant bits of the samples of the third digital data set.

By embedding the seed values in the lower significant bits of samples, the affected samples will deviate only slightly from the original values, which has been found to be virtually imperceptible as only few seed values need to be stored and as such only few samples are being affected. In additional the selection of the lower significant bits ensures that only small deviations can occur.

Even when the least significant bits of all samples are used to embed data, this deviation is not or hardly perceivable because the least significant bits are removed from the sample and this turns out to be hardly noticeable.

This removal of least significant bits from the samples reduces the space required to store the digital data set in which these samples are comprised, and thus frees up more space on the record carrier or in the transmission channel or allows the embedding of additional data such as for control purposes.

The un-mixing of the PCM samples using the basic method of the present invention may result in errors, when a read error occurs when reading from the additional data encoded in the lower significant bits of the PCM samples or even as the part of the higher significant bits of the PCM samples used for audio. The nature of this unraveling process is such that these errors—related to one (audio/data) sample—will effect the un-mixing operation of the subsequent samples. However, for optimized use of the auxiliary data area for additional data in the PCM stream, where the advanced encoding will use this auxiliary data area to store (sample frequency reduction) errors, and having all this correction data compressed, a CRC checksum will be added at the end of a data block to enable the decoder to verify the integrity of all data in such a block. By storing seed values at regular intervals, the effects caused by errors in the audio samples can be limited. When an error occurs, the error will only propagate until the next position for which seed values are known since at that point the unraveling process can be reinitiated, effectively terminating the error propagation. In addition, when a data error occurs in the seed values stored in the auxiliary data area of the lower significant bits, the unraveling based on those bad seed values will be erroneous, but only up until the next position for which seed values are known since at that point the unraveling process can be reinitiated.

By storing additional data in the auxiliary data area in the lower significant bits of the samples, the present invention the mixing or 'multiplexing' of the mixed audio data (the higher precision bits) and the encoding/decoding data (typical 2,4 or 6 bits per sample does not require any extra recording space other than the (already available) 24 bits per sample in case of BLU-Ray DVD or HD-DVD, and also that it does not require any extra information from the 'navigation' of the data on the disc (e.g. no time stamps of a chapter or stream are required).

As such, no changes in the control of the disc reading (as implemented by the embedded software of the DVD players) are required. Further no changes nor additions to the standard of these new media formats are needed in order to use this invention. Furthermore the reduction of the audio sample bit resolution and the storage of the audio decoding/encoding data into the least significant bits will be such that no audible artifacts are detected by users during normal playback with a device or system (e.g. HD-DVD or BLU-Ray DVD players) not implementing the decoding algorithms.

In a further embodiment of the method a synchronizing pattern is embedded at a position defined relative to a location of the first seed sample.

A synchronizing pattern is embedded to allow the retrieval of the first seed sample because when the synchronization pattern is detected the location of the first seed sample is known. This can also be applied to locate the second seed sample. The synchronizing pattern can be further improved by repeating the synchronizing pattern at regular intervals so that a flywheel detection can be employed to reliably detect the synchronizing pattern. This divides the storage of data in the lower significant bits into blocks which allows block by block processing to be applied.

In a further embodiment of the method previous to the step of equating samples, an error, resulting from the equation of the sample, is approximated by selecting an error approximation from a set of error approximations.

The step of equating samples is very easy to execute during the combining of the first and second digital data set but also introduces an error.

In order to reduce this error an error value is established which is selected form a limited set of error approximations to choose from.

This limited set of error approximations allows the reduction of the error while at the same time space is being saved since the error approximations can only be selected from a limited set which can be represented with less bits that the actual error encountered during the step of equating. The indexes to the error approximations requires per sample less bits then the number of bits freed up during the encoding process . . . . This is important to guarantee the compressibility of the data. This saved space allows the embedding of additional information such as the synchronizing patterns and seed samples. A sampling frequency reduction from 96 kHz to 48 kHz or from 192 kHz to 96 kHz may become an issue since higher sampling rates were introduced with the objective to re-create audio where not only sampling rate as such but mainly phase information was required in much more detail compared to Compact Disc audio recordings for high fidelity audio reproduction.

The errors due to the sample frequency reduction and the correction data (error approximations) to eliminate these errors (as much as possible) can be the result of an optimization algorithm, where the optimization criteria can be defined as a minimum sum of squared errors or may even include criteria based on perceptual audio targets.

In a further embodiment of the method after the error approximation has been established for a sample, the value of the neighboring sample to which the sample is to be equated is modified such that the sample when reconstructing the sample from the equated sample including the error approximation more closely represents the sample before equating.

The error can be further reduced if needed by modifying the value of an adjacent sample so that when the sample is equated to the adjacent sample the combination of the adjacent value and the error approximation more accurately represents the original sample value before performing the equating to it's neighbor.

In a further embodiment of the method the set of error approximations is indexed and an index representing the error approximation is embedded in the samples to which the error approximation correspond.

In a further embodiment of the method the samples are divided in blocks and the index is embedded in the samples in a first block preceding a second block comprising the samples to which the index corresponds.

A further reduction in size of the error approximation is achieved by indexing a limited set of error approximation and only storing the appropriate index in the lower significant bits of samples of the third digital data set preceding the samples to which they correspond. By embedding the index in samples of a preceding block the index and thus the error approximations are available when the unraveling process of the corresponding samples start.

In a further embodiment of the method the embedded error approximations are compressed.

Besides indexing, other methods for compression can be employed such as Lempel Ziff.

The error approximations come from a limited set of error approximations and can thus be compressed which allows the use of less space when embedding the error approximations in the samples.

This is especially beneficial if other embedded data is also present in the lower significant bits of the samples. An indexing is not necessarily available for this additional data and a general compression scheme can be used. Combinations of indexing for the error approximation and compression for the additional data can be used or an overall compression for all data embedded in the lower significant bits, i.e. error approximations and additional data, can be used.

In a further embodiment of the method the error values are embedded at a predefined offset.

A predefined offset establishes a defined relationship between the error approximations and the samples to which the error approximations correspond.

In case an index is used to store the error approximations, the index is adapted for each block and the adapted index stored in each block as well.

If possible, the index can also be chosen per digital data set or fixed and stored in the encoder and decoder but not stored in the data stream, at the expense of flexibility.

When no error approximations are used to improve the quality of the extracted audio signals, the error approximations do not need to be stored. This does not prevent the embedding and compression of other data in the lower significant bits of the digital data set.

In a further embodiment of the method the error values are embedded at a first available position with a varying position relative to the samples to which the error values correspond.

By compressing the error values in the samples as soon as there is room available the samples space is being saved which space can be used to allow for an expansion of the limited set of error values later on, in turn allowing a more accurate correction of the equated samples which results in an even better reproduction of the digital data set This could have been a method to take benefit of the space gained but a different approach is preferably taken.

The space saved from the compressed error values & list of indexes is actually used to limit the number of samples of the next block which will be mixed together. Since this number is less than the current block, the variety of the errors will be smaller and hence can be better approximated with the same number of error approximation values. These error values and referencing indexes are again compressed and space saved is again passed on to limit the number of mixed samples in the next block.

In a further embodiment of the method any lower significant bits of the samples of the third digital data set not used for embedding error approximations, or other control data, are set to a predefined value or set to zero.

Either the lower significant bits can be set to zero before the combining of the digital data sets or after the embedding of the embedded information such as seed values, synchronizing patterns and error values.

The predefined value or zero value can help distinguish the embedded data as the embedded data is no longer surrounded by seemingly random data.

It further allows the simplification of the process of combining and unraveling as it would be clear that these bits do not need processing.

It should be noted that the selection of the freed up number of bits in the lower significant bits may be implemented dynamically, in other words based on the contents of the digital data sets at that moment. E.g. silent parts of classical music may require more bits for signal resolution . . . while loud parts of pop music may not require that many bits In an embodiment of the invention the extracted signal or the embedded control data can be used to control external devices that are to be controlled synchronously with the audio signal, or control the reproduction of an extracted audio signal, for instance by defining the amplitude of the extracted audio signal relative to a base level or relative to the other audio channels not extracted from the combined signal, or relative to the combined audio signal.

The present invention describes a technique to mix (and store) Audio PCM tracks (PCM tracks are digital data sets representing digital audio channels)—typically from a 3 dimensional audio recording, but not restricted to this use—into a number of tracks which is smaller than the number of tracks used in the original recording. This combining of channels is done by mixing pairs of audio tracks into single tracks, in a way that supports an inverse operation, i.e. a decoding operation which allows an unraveling of the combined signal, to recreate the original separate audio tracks which will be perceptual identical to the original audio tracks from the master recording while at he same time the combined signal provides a an audio track which is reproducible via regular playback channels and is perceptually identical to an mix of the audio channels when reproduced. As such when combining the channels of a 3 dimensional audio recording into a set of channels normally used for 2 dimensional surround audio recording, and reproducing the combined channels without applying the inverse operation, the combined, i.e. (down-) mixed, audio recording still complies with the requirements to recreate a realistic 2 dimensional surround audio recording typically known as stereo, 4.0, 5.1 or even 7.1 surround audio formats, and playable as such, without the need for an extra device, a modified device or a decoder. This guarantees the down-wards compatibility of the resulting combined channels.

An extension to more then 2 digital data sets or two audio signals is very feasible. The technique is explained for 2 digital data sets, extending this technique to more then 2 sets can be done in a similar fashion by changing the interleaving so that for each sample of the third digital data set only one digital data set provides an un-equated sample to be combined with equated samples from the other digital data sets and that the digital data set that provides the un-equated sample is chosen in an alternating fashion from the digital data sets that provide samples.

If more than 2 digital data sets are combined, every nth sample of each digital data set is used as the equating samples of the first subset holding (n−1) per n (equal) samples of the dataset while the second subset holds 1 sample per n samples of the dataset. Per each dataset, the position of the equating samples shift by 1 position in the time domain.

As such 3 channel digital audio to 1 channel digital audio mixes (3 to 1 mix) have been found to be certainly feasible within the data rate and resolution provided by current digital audio standards. Also 4 to 1 mixes are possible in this manner.

Such mixes of digital audio channels allow the use of a first digital audio standard with a first number of independent digital audio channels for the storage, transmission and reproduction of a second digital audio standard with a second number of independent digital audio channels, where the second number of digital audio channels is higher than the first number of digital audio channels.

The invention achieves this by combining at least two digital audio channels into a single digital audio channel using the method of the invention or an encoder according to the invention. Because of the step of addition in the method the resulting digital audio stream is a perceptually pleasing representation of the two digital audio channels combined. Performing this combining for multiple channels reduces the number of channels, for instance from a 3D 9.1 configuration to a 2D 5.1 configuration. This can be achieved by for instance combining the left lower front channel and left upper front channel of the 9.1 system into one left front channel which can normally be stored, transmitted and reproduced through the left front channel of a 5.1 system.

Hence, although the signals created using the invention allow the retrieval of the original 9.1 channels by unraveling the combined signals, the combined signals are equally suitable for use by users who only have a 5.1 system. Attenuation of both channels prior to mixing or encoding may be required for a suitable down-mixed 5.1 system, such that (inverse) attenuation data of each channel is required during decoding.

The techniques developed in this invention are used—but not restricted to this use—for creating AURO-phonic audio recordings which can be stored on existing or new media carriers like HD-DVD or BLU-RAY DVD, just given as examples, without the need to add any extra media format or additions to their media format definitions, since these standards already support multi-channel audio PCM data, for instance 6 channels of 96 khz 24 bit PCM audio (HD-DVD) or 8 channels of 96 khz 24 bit PCM audio (BLU-Ray DVD) or 6 channels of 192 khz 24 but PCM audio (BLU-Ray DVD).

For AURO-phonic audio recordings more channels are required than available on these existing or new media carriers. The present invention allows the use of these media carriers, or other transmission means where a lack of channels is present and enable the use of such a system with an inadequate number of channels to be used for 3D audio storage or transmission, and at the same time ensure backward compatible with all existing playback equipment, automatically rendering the 3D audio channels in a 2D system as if it were 2D audio channels. If adapted playback equipment is present, the full set of 3D audio channels can be extracted using the decoding method or decoder according to the invention and the full 3D audio can be appropriately rendered by the system after extracting the separate digital audio channels and reproducing these individual channels.

Aurophony designates an audio (or audio+video) playback system able to correctly render the three-dimensionality of the recording room—defined by its x, y, and z axes—. A suitable sound recording combined with specific speaker layout(s) has been found to render a more natural sound.

A 3D audio recording such as Aurophony can also be defined as a surround setup with height speakers. It is this addition of height speakers that introduces a need for more channels than the currently commonly used systems can provide as the currently used 2D systems only provide for speakers substantially at the same level in a room. It is linked to certain aspects of consciousness as Aurophony merges and blends the tonal characteristics of two spaces. The increased number of channels and positioning of the speakers, allow any recordings made on this basis to enable a playback that uses the full potential of the natural three-dimensional aspects of audio. Multi-channel technology combined with the specific positioning of the speakers acoustically transport listeners to the very site of the sound event—to a virtual space—and enables them to experience its spatial dimensions in virtual mode. The width, depth, and height of this space are for the first time perceived both physically and emotionally.

Furthermore, devices like HD-DVD or BLU-Ray DVD players implement an audio mixer to mix during playback external audio channels (not read from the disc) into the audio output, or to mix audio effects typically from user navigation operation to increase the user experience. However, they also have a 'film' true mode which eliminates these audio effects during playback. This last mode is used by these players to output the multi-channel PCM mix through their audio (A/D) converters or to provide the multi channel PCM mix encrypted as an audio multi-channel mix encapsulated in the data including e.g. Video and send out using an HDMI interface for further processing. The requirement of lossless compression, for example bit-identical audio PCM data, used during playback/recording holds true for any device rendering or recording these down-mixed multi-channel PCM audio tracks whenever the decoder—as explained in this invention—is used to recreate the 3 dimensional audio recording or just a 'spatial' enhanced audio recording.

Apart from more effective or efficient audio PCM storage by combining, in an invertible way, multiple channels into a single channel, a targeted application or use is that of a 3 dimensional audio recording and reproduction, still maintaining compatibility with audio formats as provided by the standards of DVD, HD-DVD or BLU-Ray DVD. During mastering of surround audio recording or multi-channel audio, recording engineers currently have a multiple of audio tracks available and use templates to have their mastering tools create a stereo or (2Dimensional) surround audio track, which may be authored e.g. on a CD, SA-CD, DVD, BLU-Ray DVD or HD-DVD or just digitally stored on a recording device (like e.g. a Hard drive). Audio sources, which are in real-world always located in a 3 dimensional space, have so far mostly been recording as sources defined in a 2 dimensional space, even though to the audio recording engineers, $3^{rd}$ dimensional information was available or could have been easily added (e.g. sound effects like planes flying over an audience, or birds 'singing' in the sky) or recorded from a real life situation.

Up till now no general audio format has been available, except for systems where the additional series of multiple audio tracks are stored independently in a system that provides a sufficient number of tracks for storage such as in cinema applications. These additional channels however cannot be stored on recording media like HD-DVD or BLU-Ray DVD since these storage systems provide for an insufficient number of audio channels. It is the aim of this invention to create these extra 'virtual' tracks in a way that they will not interfere (or disturb) with the (2D) standard multi- or 2-channel audio information, in a way that to the recording engineers basic real time evaluation is available prior to finalizing the 3D audio recording and in a manner to still use no more than the 'standard' multi-channel tracks on these new media.

It should be noted that, although the present invention is described as targeting Audio applications, the same principles can be envisioned to be employed for video applications, for instance to create a 3-dimensional video reproduction, e.g. by using 2 simultaneous video streams (angles) each taken from a camera with a minor angular difference, to create a 3-D effect, yet combine the two video streams as detailed by the present invention and thus enabling the storage and transmission of the 3D video such that it can still be played back on regular video equipment.

EXAMPLES OF APPLICATIONS

Stereo ('Artistic') Mix Included in Surround Mix.

During mastering of audio recordings, sound engineers define or use mixing templates to, starting from a multiple audio tracks, create a 'True' or 'Artistic' stereo mix, as well as a surround mix (e.g. 4.0, 5.1, . . . ) Although matrix downmixing of the surround mix to a stereo mix is possible, one can easily illustrate the shortcomings of such down-mix matrices techniques. The matrix down-mixed stereo will substantially differ from the 'Artistic' Stereo mix, since the content from such matrix down-mixed stereo signals will be typically in the L−R domain (out of phase signals) while the true 'Artistic' stereo mix will be mainly in the L+R domain (in phase signals) with a moderate amount in the L−R domain. As just one example; the matrix-down-mixed stereo will sound substantially quieter in mono due to the high amount of out-of-phase signals. As a consequence, current surround audio recordings mastered and encoded with most of today audio encoding/decoding technology typically provide—if they care for a realistic stereo reproduction—a separate true ('Artistic') stereo version of the recording.

With an application built on the techniques of the current invention, someone familiar with this art, could easily build a system which masters the Left (front) Audio and Right (front) Audio channels of the artistic recording to the Left and Right channels, and have each of these channels mixed with a (e.g.) 24 dB attenuated Audio Delta Channel (L-artistic-L-surround) and (R-artistic-R-surround). When playing the L/R channels of a multi-channel recording without any decoder, the artistic Left/Right audio recording will be dominantly present, but when played with a decoder as explained in this invention, the mixed channels will be un-mixed first, next the (delta) channels will be (e.g.) 24 dB amplified and subtracted from the 'Artistic' channels, to create the Left and Right channels as needed for the surround mix, at that time also play the surround (L/R) channels as well as Center and Subwoofer channel.

3-Dimensional ('AURO-Phonic') Mix Included in Surround Mix.

Using the encoding technique as explained in this invention, one can easily see that the mixing of $3^{rd}$ dimensional audio information can be done, simply by mixing on each channel of a 2-dimensional 2.0, 4.0, 5.1 or even 7.1 surround mix, another audio channel representing the audio as recorded at a certain height above those 2-dimensional speakers. During mixing, these 3-rd dimensional audio channels can be attenuated, to avoid undesired audio effects, when the multi-channel recording is not used with such decoder as defined in this invention. During decoding these channels are un-mixed, and amplified when needed, and rendered on the top speakers.

Stereo ('Artistic)' Mix & 3-D ('AURO-Phonic') Mix Included in Surround Mix.

If one aims at generating an all-in-one recording, e.g. 6 channels at 96 kHz (HD-DVD) or 192 kHz (BLU-Ray DVD), useful for artistic stereo reproduction, 2-D surround reproduction or 3-D AURO-phonic reproduction, an application based on the invention can be used. The invention can be used to mix 3 channels (or more) into one channel, by reducing the 'initial' sampling rate by factor 3 (or more), and approximate the errors generated during this reduction, to restore the original signal as much as possible. This could be used to mix a 96 kHz Left Front-Artistic channel, with a 96 kHz (attenuated) Left Front Delta (L-artistic-L-surround), and with a 96 kHz (attenuated) Left Front Top. A similar mixing scheme may be applied to the Right Front channel. 2-channel mixing could be applied for Left Surround and for Right Surround. Even the Center channel can be used to mix a Center Top audio channel into.

Automated 3-D Audio Tendering from a 'Classic' 2-D Recording.

Most of the current existing audio or video productions have 2 dimensional (surround) audio tracks. Apart from the real $3^{rd}$ dimensional audio source location—which can be used during mastering and mixing with an encoder as explained in this invention to use that information as additional channels down-mixed into a 2-dimensional recording—diffuse audio as present in standard 2 dimensional audio recordings is THE candidate to be moved and rendered on top speakers of 3-dimensional audio setup. One can think of automated (off-line—or non real time) audio processes, which will extract diffuse audio out of the 2 dimensional recordings, and one may use that extracted audio to create channels which are mixed (according to the scheme of this invention) with the 'reduced' audio tracks of the 2-D surround recordings, such that one gets a surround multi channel recording which can be decoded as 3D audio. Depending on the computational requirements, this filtering technique to extract the diffuse audio out of the 2D-surround channels could be applied in real time.

The invention can be used for several devices, forming part of a 3 dimensional audio system.

An Aurophonic Encoder—Computer Application (Software) Plug-In.

Mastering and Mixing tools, commonly available for the audio/video recording and mastering world, allow third parties to develop software plug-ins. They typically provide a common data/command interface to activate the plug-ins within a complete set of tools used by mixing and mastering engineers. Since the core of the AUROPHONIC Encoder is a simple Encoder instance, with a multiple of audio channel inputs and one audio channel output on one hand and taking user settings like quality and channel attenuation/position as additional parameters into account on the other hand, a software plug-in can be provided within these audio mastering/mixing tools.

An AUROPHONIC Decoder—Computer Application (Software) Plug-In.

A software plug-in decoder as a verification tool with the Mastering and Mixing tools, can be developed in a similar way as the Encoder plug-in. Such a software plug-in decoder can also be integrated into consumer/end-user PCs' Media Players (like Windows Media Player, or DVD software players and most likely HD-DVD/Blu-Ray software players).

An AUROPHONIC Decoder—Dedicated ASIC/DSP Built in a BLU-Ray or HD-DVD Players.

Several new media High Definition formats define a multiple of high frequency/high bit resolution audio PCM streams which are (digitally) available inside their respective (consumer) players. When playing the content from these discs, using a mode where no audio PCM data is mixed/merged/attenuated/ . . . to be presented to the internal Audio Digital Analogue Converters, these Audio PCM data (could be AURO encoded data) can be intercepted by a dedicated ASIC or DSP (loaded with the AURO Decoder firmware) to decode all mixed audio channels and to generate an extra set of audio outputs to deliver e.g. artistic Left/Right audio or e.g. an additional set of Top L/R outputs.

An AUROPHONIC Decoder—Integrated as Part of BLU-Ray or HD-DVD Firmware.

Whenever an AUROPHONIC decoding process makes sense during playback of a BLU-Ray or HD-DVD disc, the playback mode of these players has to be set to TRUE-Film mode, to prevent the audio mixer of the player to corrupt/modify the original data of the PCM streams as mastered on this disc. In this mode the full processing power of the players' CPU or DSP is not required. As such it may be possible to integrate the AUROPHONIC decoder as an additional un-mixing process implemented as part of the firmware of the players° CPU or DSP.

An AUROPHONIC Decoder—ASIC/DSP Add-On in HDMI Switches, USB or FIREWIRE Audio Devices.

HDMI (High Definition Media Interface) enables the transfer of full bandwidth of multi-channel audio streams. (8 channels, 192 kHz, 24 bit). HDMI switchers regenerate the digital Audio/Video data by first de-scrambling, such that the audio data transmitted over an HDMI interface is accessible internally in such a switch. AURO encoded audio may be decoded by an add-on board implementing the AURO decoder. Similar add-on integration (typically in Audio recording/playback tools) can used for USB or FIREWIRE multi-channel audio I/O devices.

A encoder as described herein can be integrated in a larger device such as a recording system or can be a stand alone encoder coupled to a recording system or a mixing system.

The encoder can also be implemented as a computer program for instance for performing the encoding methods of the present invention when run on a computer system suitable to run said computer program.

A decoder as described herein can be integrated in a larger device such as an output module in a playback device, an input module in an amplification device or can be a stand alone decoder via its input coupled to a source of the encoded combined data stream and via its output coupled to an amplifier.

A digital signal processing device is in this document understood to be a device in the recording section of the recording/transmission/reproduction chain, such as audio mixing table, a recording device for recording on a recording medium such as optical disc or hard disk, a signal processing device or a signal capturing device.

A reproduction device is in this document understood to be a device in the reproduction section of the recording/transmission/reproduction chain, such as an audio amplifier or a playback device for retrieving data from a storage medium.

The reproduction device or decoder can be advantageously integrated in a vehicle such as a car or a bus. In a vehicle the passenger is typically surrounded by a passenger compartment.

The compartment allows the easy positioning of the speakers through which the multi channel audio is to be reproduced. Hence a designer is able to specifically tailor the audio environment to suit the reproduction of 3 dimensional or other multi channel audio inside the passenger compartment.

Another benefit is that the wiring required for the speakers can be easily hidden from sight, just as the other wiring is hidden from sight. The lower set of speakers of the 3 dimensional speaker system are positioned in the lower part of the passenger compartment, just like many speakers are currently mounted, for instance in the door panel, in the dashboard or near the floor. The upper set of speakers of the 3 dimensional speaker system can be positioned in the upper part of the passenger compartment, for instance near the roof or at another position higher than the fascia or dashboard or at least higher than the lower set of speakers.

It is also beneficial to allow the user to switch the reproduction device from a first state in which the decoder unravels audio channels and passes the unraveled audio channels to the amplifier to a second state in which the combined audio channels get passed to the amplifier. A switch between 3 dimensional reproduction and 2 dimensional reproduction can be achieved by bypassing the decoder.

In another configuration a switch between 2 dimensional reproduction and stereo reproduction is also envisaged.

The requirements for reproduction of 2 and 3 dimensional audio, such as positioning of speakers, are not part of this invention and as such will not be described in detail. It should however be kept in mind that the invention is adaptable to any channel configuration a designer of a multi channel audio reproduction device may chose, for instance when configuring a car for proper reproduction of multi channel audio.

DESCRIPTION OF THE FIGURES

The invention will now be described based on figures.

DESCRIPTION OF EMBODIMENTS

Figure 1:
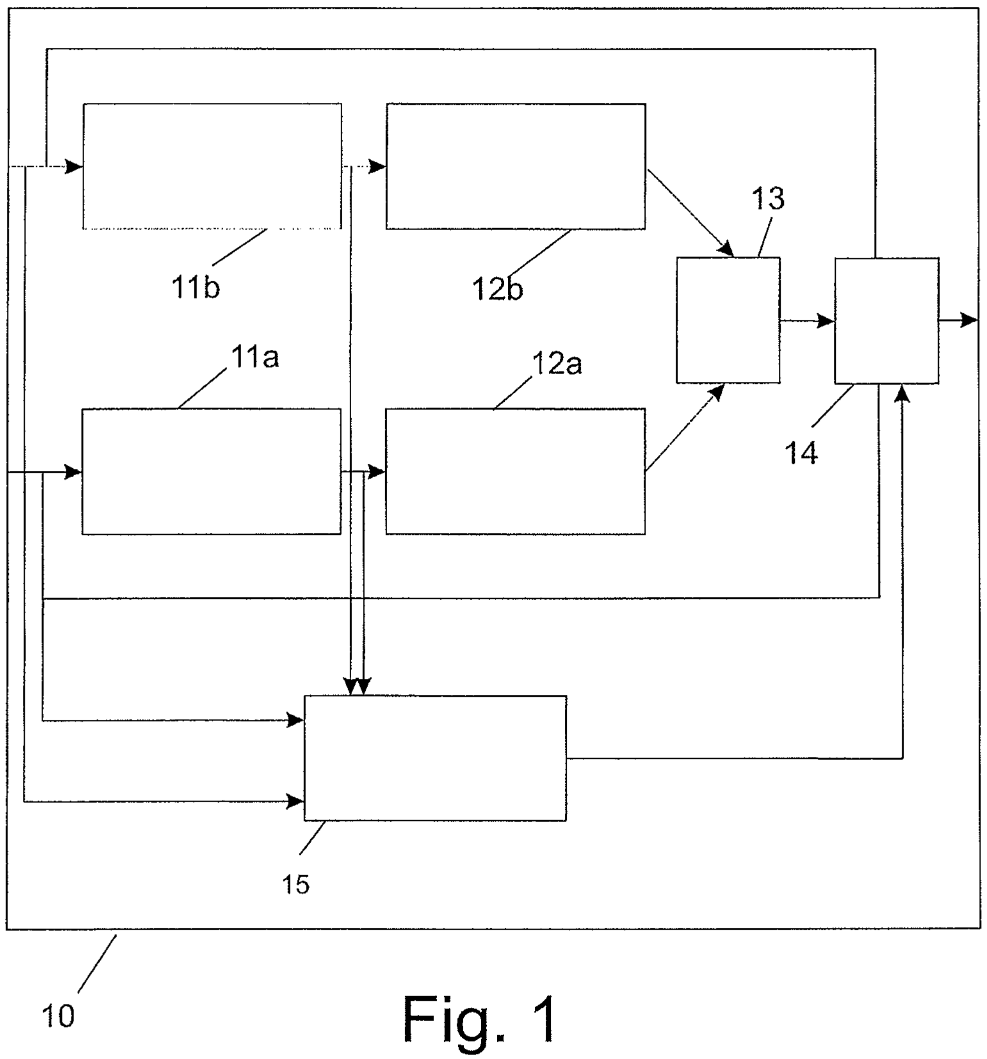
FIG. 1 shows a coder according to the invention for combining two channels.

FIG. 1 shows a coder according to the invention for combining two channels. The coder 10 comprises a first equating unit 11*a* and a second equating unit 11*b*. Each equating unit 11*a*, 11*b* receives a digital data set from a respective input of the encoder 10.

The first equating unit 11*a* selects a first subset of samples of the first digital data set and equates each sample of this first subset to neighboring samples of a second subset of samples of the first digital data set where the first subset of samples and the second subset of samples are interleaved as will be explained in detail in FIG. 2. The resulting digital data set comprising the unaffected samples of the second subset and the equated samples of the first sub set can be passed on to a first optional sample size reducer 12*a* or can be passed directly to the combiner 13.

The second equating unit 11*b* selects a third subset of samples of the second digital data set and equates each sample of this third subset to neighboring samples of a fourth subset of samples of the second digital data set where the third subset of samples and the fourth subset of samples are interleaved as will be explained in detail in FIG. 3. The resulting digital data set comprising the samples of the fourth subset and the equated samples of the third sub set can be passed on to an second optional sample size reducer 12*b* or can be passed directly to the combiner 13.

The first and second sample size reducer both remove a defined number of lower bits from the samples of their respective digital data sets, for instance reducing 24 bit samples to 20 bits by removing the four bits least significant bits.

The equating of samples as performed by the equating units 11*a*, 11*b* introduces and error. Optionally, this error is approximated by error approximator 15 by comparing the equated samples to the original samples. This error approximation can be used by the decoder to more accurately restore the original digital data sets, as explained below. The combiner 13 adds the samples of the first digital data set to corresponding samples of the second digital data set, as provided to its inputs, and supplies the resulting samples of the third digital data set via its output to a formatter 14 which embeds additional data such as seed values from the two digital data sets and the error approximations as received from the error approximator 15 in the lower significant bits of the third digital data set and provides the resulting digital data set to an output of the coder 10.

In order to explain the principle the embodiments are explained using two input streams but the invention can equally be used with three or more input streams being combined into one single output stream.

Figure 2:
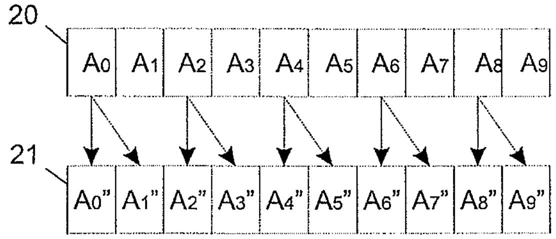
FIG. 2 shows a first digital data set being converted by equating samples

FIG. 2 shows a first digital data set being converted by equating samples. The first digital data set 20 comprises a sequence of samples values $A_0, A_1, A_2, A_3, A_4, A_5, A_6, A_7, A_8, A_9$. The first digital data set is divided into a first subset of samples $A_1, A_3, A_5, A_7, A_9$ and a second subset of samples $A_0, A_2, A_4, A_6, A_8$.

Subsequently each the value of each sample $A_1, A_3, A_5, A_7, A_9$ of the first subset of samples is equated to the value of the neighboring sample $A_0, A_2, A_4, A_6, A_8$ from the second subset as indicated by the arrows in FIG. 2.

Figure 6:
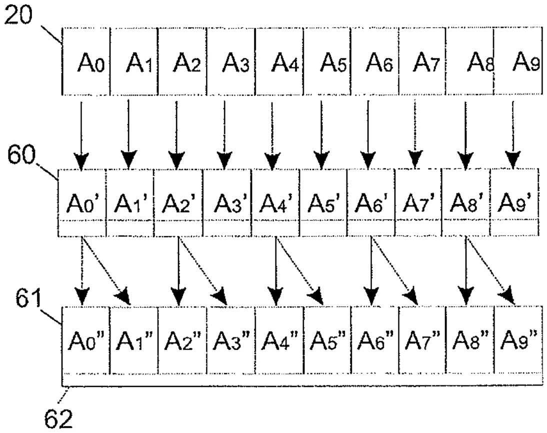
FIG. 6 shows an improved conversion of the first digital data set.

In particular, this means that the value of sample $A_1$ is replaced by the value of the neighboring sample $A_0$, i.e. the value of sample $A_1$ is equated to value of sample $A_0$. This results in an first intermediate digital data set 21 as show, comprising the sample values $A_0''$, $A_1''$, $A_2''$, $A_3''$, $A_4''$, $A_5''$, $A_6''$, $A_7''$, $A_8''$, $A_9''$, etc, where the value $A_0''$, equals the value $A_0$ and $A_1''$ equals the value $A_0$ etc. In FIG. 6 an embodiment will be shown where $A_0''$ no longer is equal to A due to a reduction in number of bits in the sample.

Figure 3:
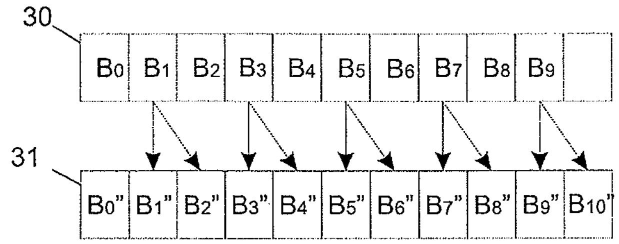
FIG. 3 shows a second digital data set being converted by equating samples

FIG. 3 shows a second digital data set being converted by equating samples.

The second digital data set 30 comprises a sequence of samples values $B_0$, $B_1$, $B_2$, $B_3$, $B_4$, $B_5$, $B_6$, $B_7$, $B_8$, $B_9$. The second digital data set is divided into a third subset of samples $B_0$, $B_2$, $B_4$, $B_6$, $B_8$ and a fourth subset of samples $B_1$, $B_3$, $B_5$, $B_7$, $B_9$.

Subsequently each the value of each sample $B_0$, $B_2$, $B_4$, $B_6$, $B_8$ of the third subset of samples is equated to the value of the neighboring sample $B_1$, $B_3$, $B_5$, $B_7$, $B_9$ from the fourth subset as indicated by the arrows in FIG. 3.

In particular, this means that the value of sample $B_2$ is replaced by the value of the neighboring sample $B_1$, i.e. the value of sample $B_2$ is equated to value of sample $B_1$.

Figure 7:
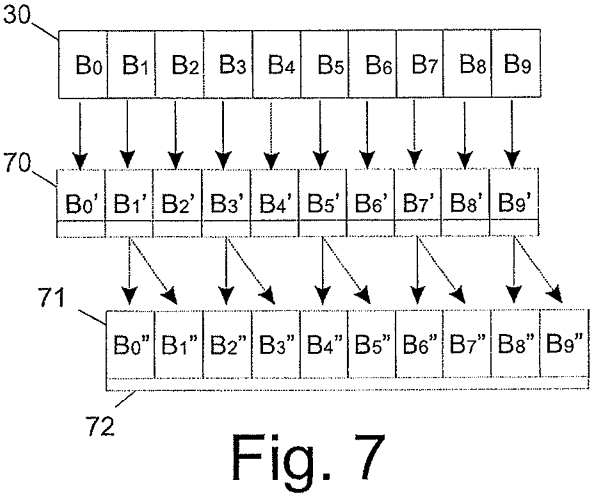
FIG. 7 shows an improved conversion of the second digital data set.

This results in an second intermediate digital data set 31 as show, comprising the sample values $B_0''$, $B_1''$, $B_2''$, $B_3''$, $B_4''$, $B_5''$, $B_6''$, $B_7''$, $B_8''$, $B_9''$, where the value $B_1''$ equals the value $B_1$ and $B_2''$ equals the value $B_1$, etc. In FIG. 7 an embodiment will be shown where $B_1''$ no longer is equal to $B_1$ due to a reduction in number of bits in the sample.

Figure 4:
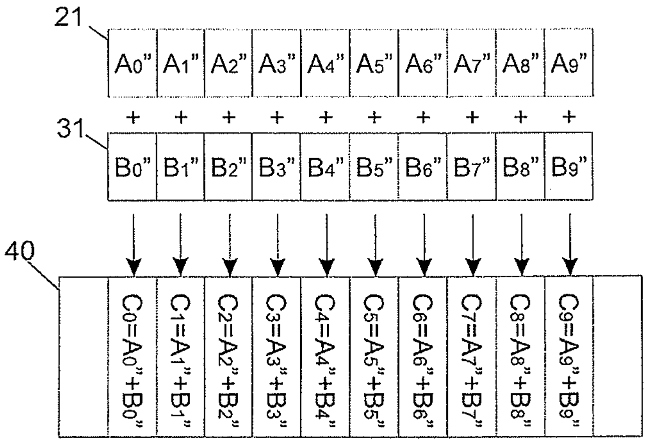
FIG. 4 shows the encoding of the two resulting digital data sets into a third digital data set.

FIG. 4 shows the encoding of the two resulting digital data sets into a third digital data set.

The first intermediate digital data set 21 and the second intermediate digital data set 31 are now combined by adding the corresponding samples.

For instance the second sample $A_1''$ of the first intermediate digital data set 21 is added to the second sample $B_1''$ of the second intermediate digital data set 31. The resulting first combined sample $C_1$ is placed at the second position of the third digital data set 40 and has a value $A_1''+B_1''$.

The third sample $A_2''$ of the first intermediate digital data set 21 is added to the third sample $B_2''$ of the second intermediate digital data set 31. The resulting second combined sample $C_2$ is placed at the third position of the third digital data set 40 and has a value $A_2''+B_2''$.

Figure 5:
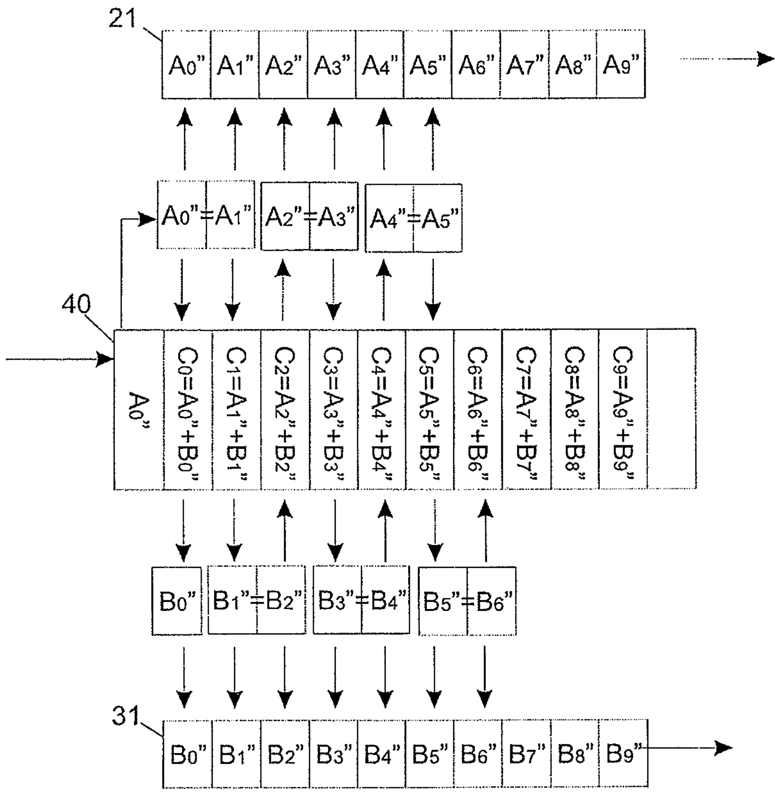
FIG. 5 shows the decoding of the third digital data set back into two separate digital data sets.

FIG. 5 shows the decoding of the third digital data set back into two separate digital data sets.

The third digital data set 40 is provided to a decoder for unraveling the two digital data sets 31, 32 comprised in the third digital data set 40.

The first position of the third digital data set 40 is shown to hold the value $A_0''$ which is a seed value needed during the decoding. This seed value can be stored elsewhere but is shown in the first position for convenience during the explanation.

The second position holds the first combined sample with a value of $A_0''+B_0''$. Because the decoder knows the seed value $A_0''$, as retrieved from the first position, the sample value of the second intermediate digital data set can be established by subtracting $C_0-A_0''=(A_0''+B_0'')-A_0=B_0''$.

This retrieved sample value $B_0''$ is used to reconstruct the second intermediate digital data set but is also used to retrieve a sample of the first intermediate digital data set. Since the value $A_0''$ is now known, and it is known that its neighboring sample $A_1''$ has the same value, the sample of the 2nd intermediate digital data set can now be calculated:

$$C_1-A_1''=(A_1''+B_1'')-A_1''=B_1''.$$

This retrieved sample value $B_1''$ is used to reconstruct the 2nd-intermediate digital data set but is also used to retrieve a sample of the first intermediate digital data set.

Since the value $B_1''$ is now known, and it is known that its neighboring sample $B_2''$ has the same value, the sample of the first intermediate digital data set can now be calculated:

$$C_2-B_2''=(A_2''+B_2'')-B_2''=A_2''.$$

This retrieved sample value $A_2''$ is used to reconstruct the first intermediate digital data set but is also used to retrieve a sample of the 2nd intermediate digital data set.

This can be repeated as shown in FIG. 5 for the remaining samples.

In order to approximate the first original digital data set 20 the retrieved first intermediate digital data set can be processed using information about the signal known to the system, for instance for an audio signal the samples lost by the encoding and decoding (the equated samples) can be reconstructed by interpolation or other known signal reconstruction methods. As will be shown later, it is also possible to store information about the error introduced by the equating in the signal and use this error information to reconstruct the samples close to the value they had before equating, i.e. close to the value they had in the original digital data set 21.

The same can of course be performed for every retrieved intermediate digital data set in order to restore the equated samples to a value as close as possible as the original value of the samples in the original digital data set.

In the following description of FIGS. 6, 7 and 8, the 2 original channels are reduced in bit resolution e.g. from 24 bits per sample to 18 bits. Next to reducing the sample resolution, the sampling frequency is reduced to half of the original sampling frequency (in this example starting from 2 audio channels having each the same bit resolution and sampling frequency). Other combinations are possible like starting from X bits and reducing to Y bits (e.g. X/Y=24/22, 24/20, 24/16 etc. . . . or 20/18, 20/16, or 16/15, 16/14, . . . ) given the requirements of high fidelity audio, one should not reduce a sample in bit resolution below 14 bits . . . . If more channels are mixed, the basic technique described herein requires the sampling frequency to be divided by the number of channels, which need to be mixed into one channel. The more channels are mixed, the lower the real sampling frequency of the channels (prior to mixing) will be. In HD-DVD or BLU-Ray DVD the initial sampling frequency can be as high as 96 kHz or even (BLU-Ray) as high as 192 kHz. Starting from 2 channels with a sampling frequency each of 96 kHz, and reducing both to 48 kHz still leaves a sampling frequency in the range of high fidelity audio. Even 3 channels mixed, and reduced to 32 kHz is acceptable for movie/TV audio quality (this is a frequency as used by NICAM digital broadcasted TV audio.) Starting from true 192 kHz recording, gives a way to mix 4 channels, reducing the sampling frequency to 48 kHz FIG. 6 shows an improved conversion of the first digital data set. In the improved conversion the lower significant bits of the samples are no longer representing the original sample but are use to store additional information such as seed values, synchronizing patterns, information about errors caused by the equating of samples or other control information.

The first digital data set 20 comprises a sequence of samples values $A_0$, $A_1$, $A_2$, $A_3$, $A_4$, $A_5$, $A_6$, $A_7$, $A_8$, $A_9$. Each sample $A_0$, $A_1$, $A_2$, $A_3$, $A_4$, $A_5$, $A_6$, $A_7$, $A_8$, $A_9$ is truncated resulting in truncated or rounded samples $A_0'$, $A_1'$, $A_2'$, $A_3'$, $A_4'$, $A_5'$, $A_6'$, $A_7'$, $A_8'$, $A_9'$. This set 60 of truncated samples $A_0'$, $A_1'$, $A_2'$, $A_3'$, $A_4'$, $A_5'$, $A_6'$, $A_7'$, $A_8'$, $A_9'$, where the lower significant bits are considered, or do actually not carry information about the sample anymore is subsequently processed as is explained in FIG. 2. The set 60 of truncated samples is divided into a first subset of samples $A_1'$, $A_3'$, $A_5'$, $A_7'$, $A_9'$ and a second subset of samples $A_0'$, $A_2'$, $A_4'$, $A_6'$, $A_8'$.

Subsequently each the value of each sample $A_1'$, $A_3'$, $A_5'$, $A_7'$, $A_9'$ of the first subset of samples is equated to the value of the neighboring sample $A_0'$, $A_2'$, $A_4'$, $A_6'$, $A_8'$ from the second subset as indicated by the arrows in FIG. 6.

In particular, this means that the value of sample $A_1'$ is replaced by the value of the neighboring sample $A_0$, i.e. the value of sample $A_1'$ is equated to value of sample $A_0'$. This results in an first intermediate digital data set 61 as show, comprising the sample values $A_0''$, $A_1''$, $A_2''$, $A_3''$, $A_4''$, $A_5''$, $A_6''$, $A_7''$, $A_8''$, $A_9''$, etc, where the value $A_0''$, equals the value $A_0'$ and $A_1''$ equals the value $A_0'$ etc.

It should be noted that, because of the truncation, i.e. rounding of the samples, a reserved area 62 is created in the first intermediate digital data set 61.

FIG. 7 shows an improved conversion of the second digital data set.

In the same way as for the first digital data set, the conversion can be improved in that the lower significant bits of the samples are no longer representing the original sample but are use to store additional information such as seed values, synchronizing patterns, information about errors caused by the equating of samples or other control information. The first digital data set 30 comprises a sequence of samples values $B_0$, $B_1$, $B_2$, $B_3$, $B_4$, $B_5$, $B_6$, $B_7$, $B_8$, $B_9$. Each sample $B_0$, $B_1$, $B_2$, $B_3$, $B_4$, $B_5$, $B_6$, $B_7$, $B_8$, $B_9$ is truncated resulting in truncated or rounded samples $B_0'$, $B_1'$, $B_2'$, $B_3'$, $B_4'$, $B_5'$, $B_6'$, $B_7'$, $B_8'$, $B_9'$. This set 70 of truncated samples $B_0'$, $B_1'$, $B_2'$, $B_3'$, $B_4'$, $B_5'$, $B_6'$, $B_7'$, $B_8'$, $B_9'$, where the lower significant bits are considered, or do actually not carry information about the sample anymore is subsequently processed as is explained in FIG. 3.

The set 70 of truncated samples $B_0'$, $B_1'$, $B_2'$, $B_3'$, $B_4'$, $B_5'$, $B_6'$, $B_7'$, $B_8'$, $B_9'$ is divided into a third subset of samples $B_0''$, $B_2'$, $B_4'$, $B_6'$, $B_8'$ and a fourth subset of samples $B_1'$, $B_3'$, $B_5'$, $B_7'$, $B_9'$.

Subsequently each the value of each sample $B_0'$, $B_2'$, $B_4'$, $B_6'$, $B_8'$ of the third subset of samples is equated to the value of the neighboring sample $B_1'$, $B_3'$, $B_5'$, $B_7'$, $B_9'$ from the fourth subset as indicated by the arrows in FIG. 3.

In particular, this means that the value of sample $B_2'$ is replaced by the value of the neighboring sample $B_1'$, i.e. the value of sample $B_2'$ is equated to value of sample $B_1'$. This results in an second intermediate digital data set 71 as show, comprising the sample values $B_0''$, $B_1''$, $B_2''$, $B_3''$, $B_4''$, $B_5''$, $B_6''$, $B_7''$, $B_8''$, $B_9''$, where the value $B_2''$ equals the value $B_1'$ and $B_1''$ equals the value $B_1'$, etc.

It should be noted that, because of the truncation, i.e. rounding of the samples, a reserved area 72 is created in the second intermediate digital data set 71.

The resolution reduction introduced by the rounding as explained in FIGS. 6 and 7 is in principle 'unrecoverable' but techniques to increase the perceived sample frequency can be applied. If more bit resolution is required, the invention allows for increasing the value of Y (bits actually used) at the expense of less 'room' available for encoded data or X bits per sample. Of course the error approximation stored in the data block in the auxiliary data area allows a substantial reduction in perceived loss of resolution.

For a 24 bit PCM audio stream, with an 18/6 format and mixing 2 channels we have 18 bit audio samples and 6 bit data samples, each data block starts with a sync of 6 data samples (6 bit each), 2 data samples (12 bits in total) are used to store the length of the data block and finally 2×3 data samples (2×18 bit) are used to store duplicate audio samples. For other formats (examples):

16/8: sync of 8 data samples, 2 data samples (16 bit, only 12 bits used) for length and 2×2 data samples (2×16 bit) for duplicate audio samples;

20/4: sync of 4 data samples, 3 data samples (12 bit in total) for length and 2×5 data samples (2×20 bit) for duplicate audio samples 22/2: sync of 2 data samples, 6 data samples (12 bit in total) for length and 2×11 data samples (2×22 bit) for duplicate audio samples.

For other formats (e.g. 16 bit PCM audio, with 14/2 format) similar structures can be defined.

Figure 8:
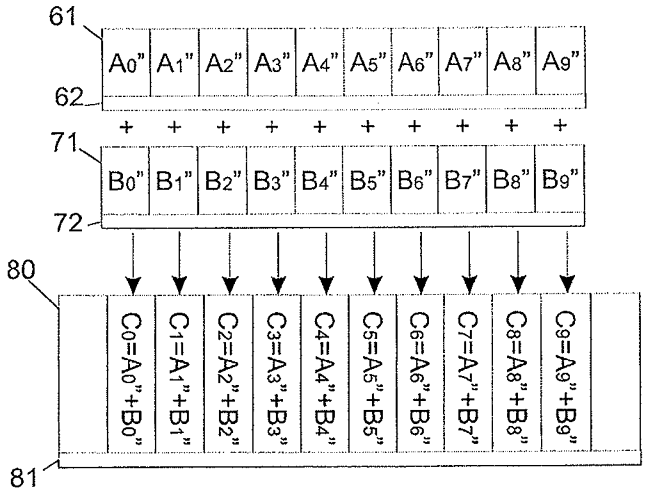
FIG. 8 shows the encoding of the two resulting digital data sets into a third digital data set.

FIG. 8 shows the encoding of the two resulting digital data sets into a third digital data set.

The encoding is performed in the same way as described in FIG. 4.

Now that the first intermediate digital data 61 set has a reserved area 62 and the second intermediate digital data set 71 also has a reserved area 72, the addition of both digital data sets now results in a third digital data set 80 with a auxiliary data area 81.

In this auxiliary data area 81 additional data can be placed.

When the third digital data set 80 is reproduced through equipment that is not aware of the presence of this auxiliary data area 81 the data in this auxiliary data area 81 will be interpreted by such equipment as being the lower significant bits of the digital data set to be reproduced.

The data placed in this auxiliary data area 81 will hence introduce a slight noise to the signal which is largely imperceptible. This imperceptibility is of course dependent on the number of lower significant bits chosen to be reserved for this auxiliary data area 81 and it is easy for the skilled person to chose the appropriate amount of lower significant bits to be used in order to balance the requirement of data storage in the auxiliary data area 81 and the resulting loss in quality in the digital data set. It is evident that in a 24 bit audio system the number of lower significant bits dedicated to the auxiliary data area 81 can be higher than in a 16 bit audio system.

In order for these mixed audio channels, to enable the inverse (or un-mix) operation, duplicate copies of restricted number of samples are stored.

Although in the examples above only a single seed value sample, i.e. duplicate copy of a sample, is used and stored, storing multiple seed value samples is advantageous in that redundancy is provided. This redundancy is both due to the repeated nature of stored seed values that allow the recovery from errors by providing new starting points in the stream and due to the fact that two seed values for each start position can be stored. The seed values A0 and B1 allow the verification of the starting position since the calculation starting with A0 will yield the value B0 which then can be compared to the stored seed value for verification. A further advantage is that the storage of both A0 and B1 allows a search of the correct starting position to which the two seed values belong, allowing a self synchronization between the seed values and the digital data set C as it is likely that at one position where decoding using the seed value A0 will result in exactly a value B1 that is equal to the stored seed value B1.

When starting, as an example, from a 24 (Z) bit 96 kHz sampled signal reduced to 18 (Y) bit 48 kHz, and creating a duplicate of one sample per msec, i.e. one seed value per msec, 1000 18 bits sample duplicates, i.e. seed values, per channel mixed. If this mixing includes 2 channels, we will need 2×1000×18 bits or 36K bits of 'storage' for sample duplicates per second. Because first extra 'space'—6 (X) bits per sample at 96K per second—was created 6×96=576K bits per second is available in the auxiliary data area formed by the lower significant bits, in where these duplicate copies of sample values can be stored easily. In fact, there is 16× the memory available to store these copies and as such it would be possible to store duplicate samples of these 2 channels at a rate of 16 times per msec if no other information were to be stored in this auxiliary data area. If other values for Z/Y/X are selected, e.g. 24/20/4 at 96 kHz or 16/14/2 at 44.1 kHz the amount of created 'free' auxiliary data area by using the least significant bits will be different. The following cases are given as examples, but the invention is not restricted to these other use cases; 2 channels at 24/20/4@96 kHz and 4×96=392K bits per second memory requiring 2×1000×20=40 Kbits for duplicate samples per msec, it is possible to store duplicate samples at a rate of 9.6 times per msec. 2 channels at 16/14/2@44.1 kHz and 2×44.1=88.2K bits per second memory requiring 2×1000×14=28 Kbits for duplicate samples per msec, it is possible to store duplicate samples at a rate of 3.15 per msec. The examples mentioned here use the auxiliary data area formed by the lower significant bits of the samples exclusively for duplication of samples from the original (resolution and frequency reduced) audio streams. Due to the nature and characteristics of the technique as used here, it is beneficial to not solely use this 'free' auxiliary data area for storage of duplicate samples, although these sample duplicates are essential information used by the un-mixing process or decoder.

In the Basic technique, as explained in FIGS. 2-8, 2 PCM audio streams A ($A_0$, $A_1$, $A_2$,) and B ($B_0$, $B_1$, $B_2$,), are first reduced in bit resolution, to generate 2 new streams A' ($A'_0$, $A'_1$, $A'_2$,) and B' ($B'_0$, $B'_1$, $B'_2$,). Next the sampling frequency of these streams is reduced to half of the original sampling frequency, giving A" ($A''_0$, $A''_1$, $A''_2$) and B" ($B''_0$, $B''_1$, $B''_2$). This last operation introduces Errors, with $A''_{2i}=A''_{2i+1}=A'_{2i}$ generating an Error $E_{2i+1}=A'_{2i+1}-A'_{2i}$ and $B''_{2i+1}=B''_{2i+2}=B'_{2i+1}$ ($B''_0=B'_0$) generating an Error $E_{2i+2}=B'_{2i+2}-B'_{2i+1}$ ($E_0=0$). This Error Series ($E_0$, $E_1$, $E_2$, $E_3$ . . . ) contains Errors with even index due to sampling reduction of audio stream B and errors with odd index because of sampling reduction of audio stream A. The advanced encoding will approximate these Errors and use these approximations to reduce the errors prior to mixing. The approximated Errors (which are represented as the inverses of the real Errors) E' are added as a separate channel established in the auxiliary data area in the lower significant bits of the samples as part of the mixing. As such the mixed signal is defined by Z=A"+B"+E' with samples ($Z_i=A_i''+B_i''+E_i'$). If the Error stream can be approximated exactly then E'=E with $Z_{2i}=A_{2i}''+B''_{2i}+E_{2i}=A'_{2i}+B'_{2i-1}+B'_{2i}-B'_{2i-1}=A'_{2i}+B'_{2i}$ and $Z_{2i+1}=A_{2i+1}''+B''_{2i+1}+E_{2i+1}=A'_{2i}+B'_{2i+1}+A'_{2i+1}-A'_{2i}=A'_{2i+1}+B_{2i+1}$. In such case, reduction errors are generated in the final mixed stream.

Figure 9:
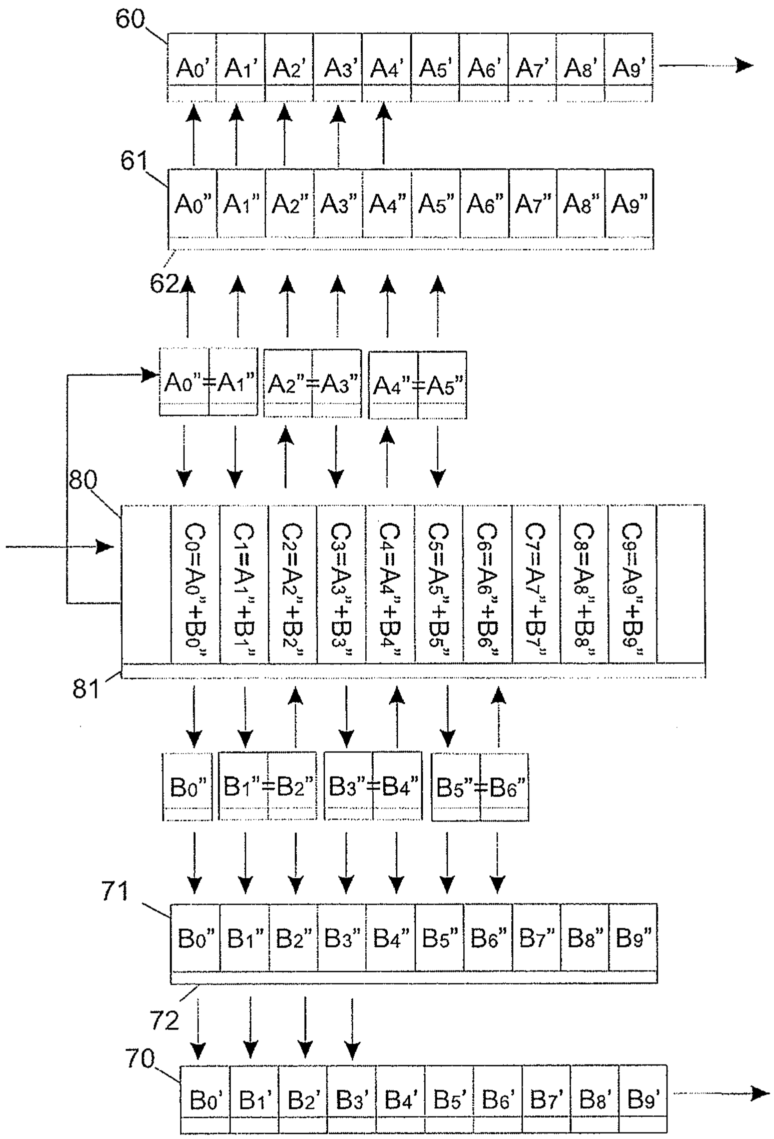
FIG. 9 shows the decoding of the third digital data set back into two separate digital data sets.

FIG. 9 shows the decoding of the third digital data set back into two separate digital data sets.

The decoding of the digital data set 80 obtained by the enhanced coding, i.e. with the lower significant bits 81 used to store additional data, is performed just like the regular decoding described in FIG. 5, but only the relevant bits of each sample $A_0''$, $A_1''$, $A_2''$, $A_3''$, $A_4''$, $A_5''$, $A_6''$, $A_7''$, $A_8''$, $A_9''$, $B_0''$, $B_1''$, $B_2''$, $B_3''$, $B_4''$, $B_5''$, $B_6''$, $B_7''$, $B_8''$, $B_9''$, i.e. not the lower significant bits, are provided by the decoder. The decoder can further retrieve the additional data stored in the auxiliary data area 81 in the lower significant bits. This additional data can subsequently be passed along to the target of the additional data as explained in FIG. 20.

Once the decoder has these duplicate samples, the seed values, reconstructed, these duplicate samples (seed values) are then used to un-mix the mixed channel. The mixed channel is for example a mix of PCM stream A" and B", with $A''_{2i}=A''_{2i+1}=A'_{2i}$ and $B''_{2i+1}=B''_{2i+2}=B'_{2i+1}$. $A'_0$ and $B'_1$ will be used as duplicate samples and encoded into the data block.

Un-Mixing of the (mono) signals out of A"+B" can be done, alternative to the method explained in FIG. 5 where only one seed value was used, as follows: The A"+B" samples are: $A''_0+B''_0$, $A''_1+B''_1$, $A''_2+B''_2$, $A''_3+B''_3$, $A''_4+B''_4$, $A''_5+B''_5$. Because we have a copy of $A''_0=A'_0$ & $B''_1=B'_1$ we can reconstruct the A" & B" streams.

1. with $A''_0+B''_0-(A''_0=A'_0)$ we get $B''_0$ and got $A''_0$ from the duplicate sample
2. with $A''_1+B''_1{}''-(B''_1=B'_1)$ we get $A''_1$ and got $B''_1$ from the duplicate sample
3. with $A''_2+B''_2-(B''_2=B''_1)$ we get $A''_2$ and $B''_2=B''_1$
4. with $A''_3+B''_3-(A''_3=A''_2)$ we get $B''_3$ and $A''_3=A''_2$
5. with $A''_4+B''_4-(B''_4=B''_3)$ we get $A''_4$ and $B''_4=B''_3$
6. with $A''_5+B''_5-(A''_5=A''_4)$ we get $B''_5$ and $A''_5=A''_4$
7. . . .

On media formats as HD-DVD or BLU-Ray DVD multi-channel audio can be stored as a multiplex of PCM audio streams. Using the mixing/un-mixing technique as explained above on each of these channels, one can easily duplicate the number of channels (from 6 or 8 to 12 or 16). This allows to store or create a 3rd dimension of the audio recording or reproduction by adding a top speaker above every ground speaker but does not require a user to have a decoder to listen to the '2-dimensional' version of the audio since the audio stored on the multi-channel audio tracks is still 100% PCM 'playable' audio. In this last mode of reproduction, the effect of the 3rd dimension will not be created but it also will not degrade the perceivable quality of the 2 dimensional audio recording.

Figure 10:
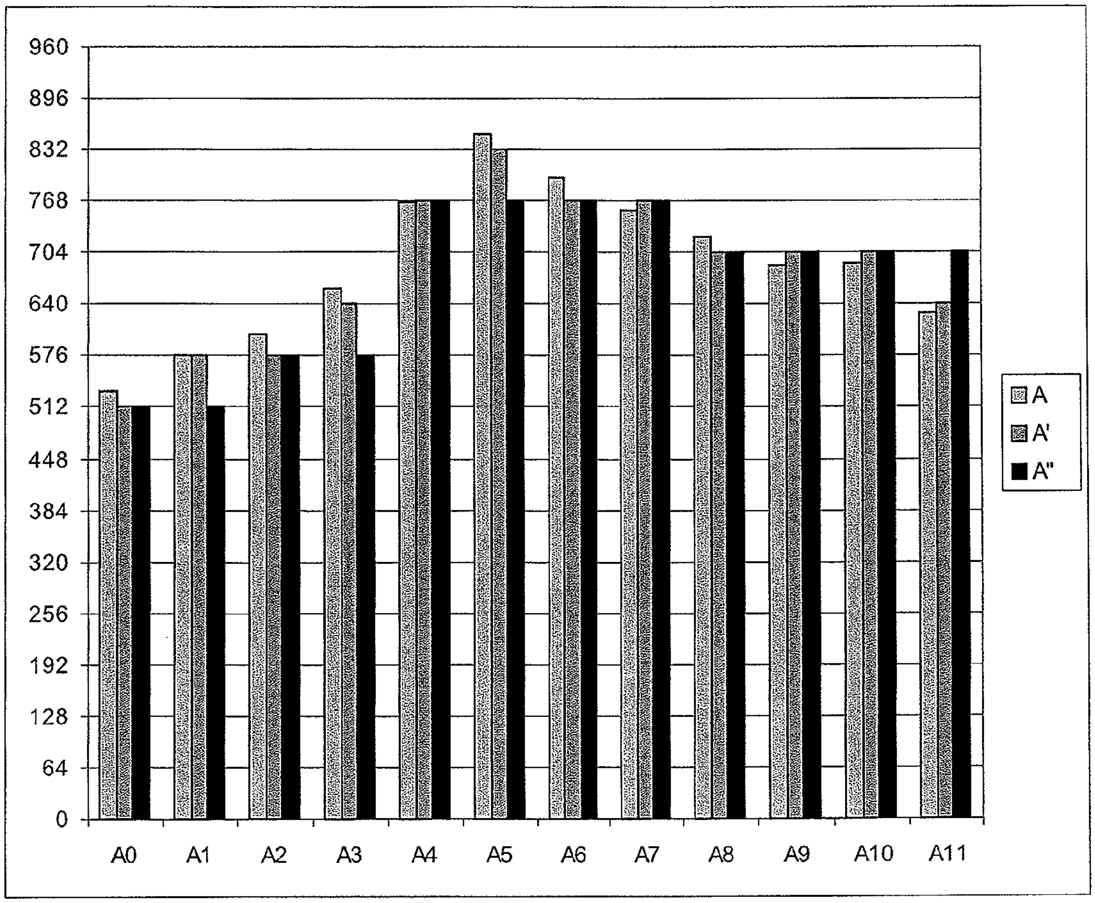
FIG. 10 shows an example where samples of the first stream A as obtained by the coding as described in FIG. 6 are depicted.

FIG. 10 shows an example where samples of the first stream A as obtained by the coding as described in FIG. 6 are depicted.

As an example, 2 mono 96 kHz 24 bit digital audio streams, A & B are assumed to be processed.

A=original samples (24 bit), A'=rounded samples (18H bits significant & 6L bits=0), A"=sampling Freq. Reduced samples In FIG. 10, a first audio stream A is shown in the graph as a dark gray line. Samples of A are: $A_0$, $A_1$, $A_2$, $A_3$, $A_4$, $A_5$, . . . . The resolution of each sample is 24 (Z) bits per sample represented as a 24 bit signed integer value, so values range from $-2^{(Z-1)}$ to $(2^{(Z-1)}-1)$. From this sample series, we reduce the resolution to 18 (Y) bits, clearing the 6 (X) least significant bits to create 'room' for encoded data. Reduction is achieved by rounding all Z bit samples to their nearest representation using only Y most significant bits of a total of Z. Hereto each sample is incremented with $(2^{(X-1)}-1)$, each total is limited to $(2^{(Z-1)}-1)$ or represented as $[\,]_{(2^{(Z-1)}-1)}$. Next we set the 6 (X) least significant bits to 0 by bit-wise AND with $((2^{(Y)}-1)$ bit-wise shifted X bits to the left), as such we generate a new stream A' (light gray). Samples of A' are: $A'_0$, $A'_1$, $A'_2$, . . .

$$\text{with } A'_i=[A_i+(2^{(X-1)}-1)]_{(2^{(Z-1)}-1)} \text{ AND } ((2^{(Y)}-1)\ll X)$$

After reduction of the sample resolution we also reduce the sampling frequency by a factor of 2 (in case we would mix more then 2 channels we need to reduce the sampling frequency by a factor equal to the number of channels mixed). Hereto we repeat every even sample of the original stream A'. After sample frequency reduction we get a new stream A". Samples of A" are: $A''_0$, $A''_1$, $A''_2$, . . .

$$\text{with } A'_{2i}=A''_{2i+1}=A'_{2i}$$

All even samples of A" at index 2i are identical to the original data of A' at index 2i and all odd samples of A" at index 2i+1 are duplicates of previous sample of A" at index 2i.

Figure 11:
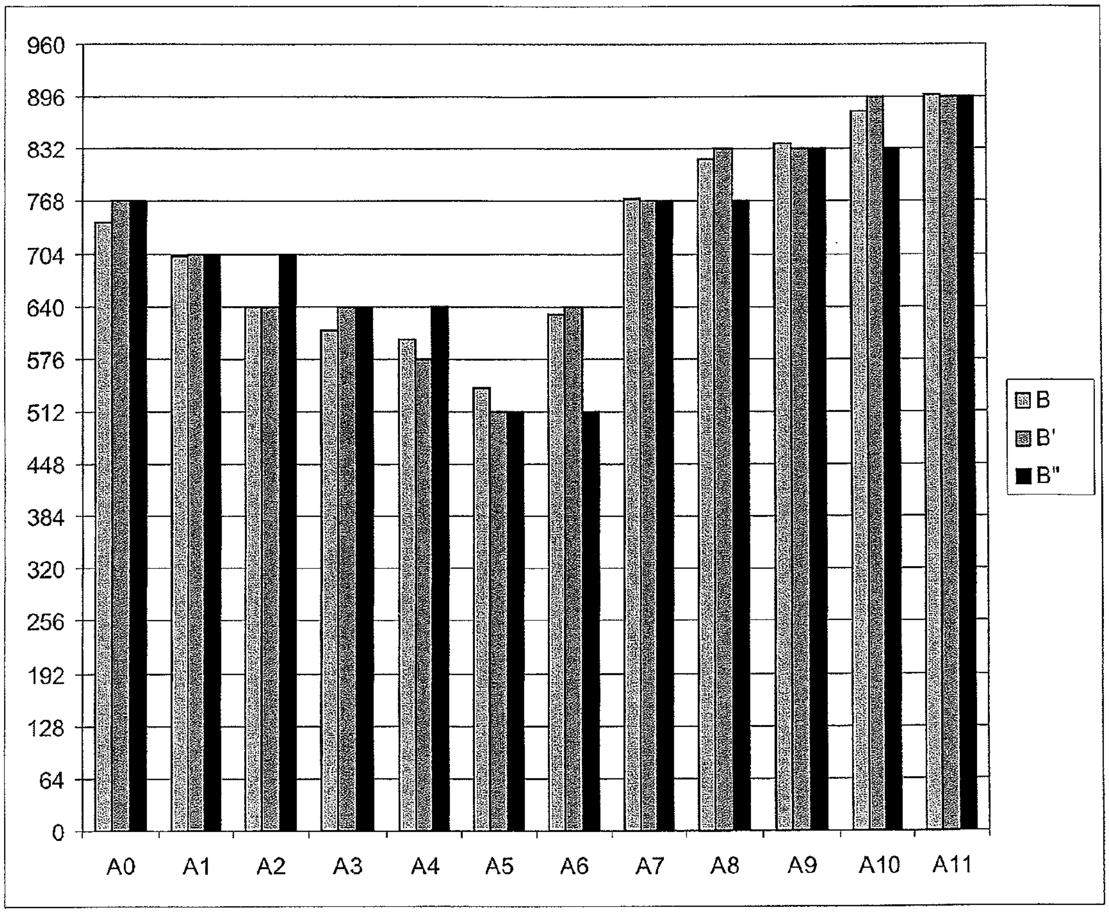
FIG. 11 shows an example where samples of the first stream B as obtained by the coding as described in FIG. 7 are depicted.

FIG. 11 shows an example where samples of the first stream B as obtained by the coding as described in FIG. 7 are depicted.

B=original samples (24 bit), B'=rounded samples (18H bits significant & 6L bits=0), B"=sampling Freq. Reduced samples.

In FIG. 11, a second audio stream B is shown in the graph as a dark gray line. The same sample resolution reduction is applied to this stream. Samples of B are: $B_0$, $B_1$, $B_2$, $B_3$, $B_4$, $B_5$, . . . . From this sample series, we generate a new stream B' (light gray). Samples of B' are: $B'_0$, $B'_1$, $B'_2$, . . .

$$\text{with } B'_i=[B_i+(2^{(X-1)}-1)]_{(2^{(Z-1)}-1)} \text{ AND } ((2^{(Y)}-1)<<X)$$

After reduction of the sample resolution we also reduce the sampling frequency similarly by a factor of 2 and we get a new stream B". Samples of B" are: $B''_0$, $B''_1$, $B''_2$, . . .

$$\text{with } B''_{2i+1}=B''_{2i+2}=B'_{2i+1}$$

All odd samples of B" at index 2i+1 are identical to the original data of B' at index 2i+1 and all even samples of B" at index 2i+2 are duplicates of previous sample of B" at index 2i+1.

Figure 12:
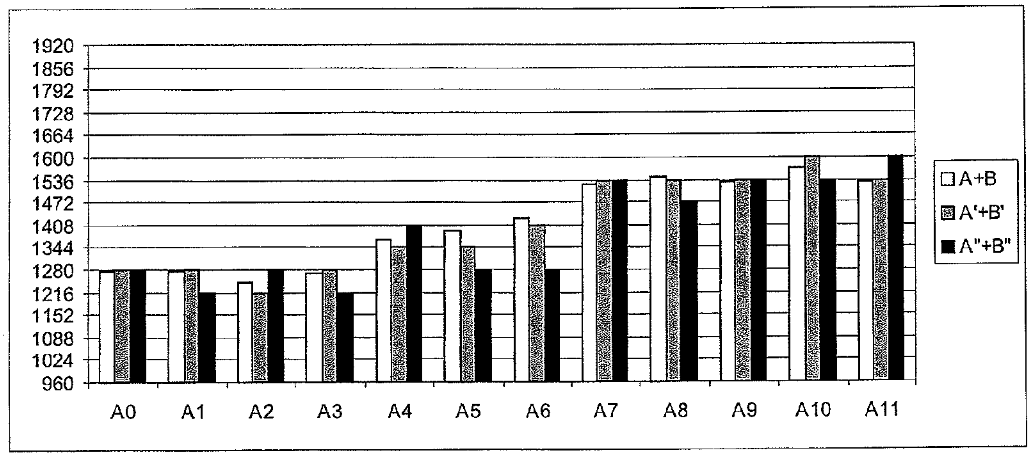
FIG. 12 shows the samples of the mixed stream C.

FIG. 12 shows the samples of the mixed stream C.

A+B=original samples (24 bit), A'+B'=rounded samples (18 H bits significant & 6 L bits=0), A"+B"=sampling Freq. Reduced samples.

Both streams A+B are mixed (added) to get a new stream (dark gray). Mix (add) streams A" and B" and we get another stream (light gray). A"+B" will be different from A+B and from A'+B' for every sample since A" or B" may differ from the original samples A and B due to bit resolution reduction (rounding), and may differ from the resolution reduced samples due to sample reduction, but generally, we still have a good perceptual approximation of the original A+B (dark gray) stream due to the original high bit resolution and high sampling frequency.

Figure 13:
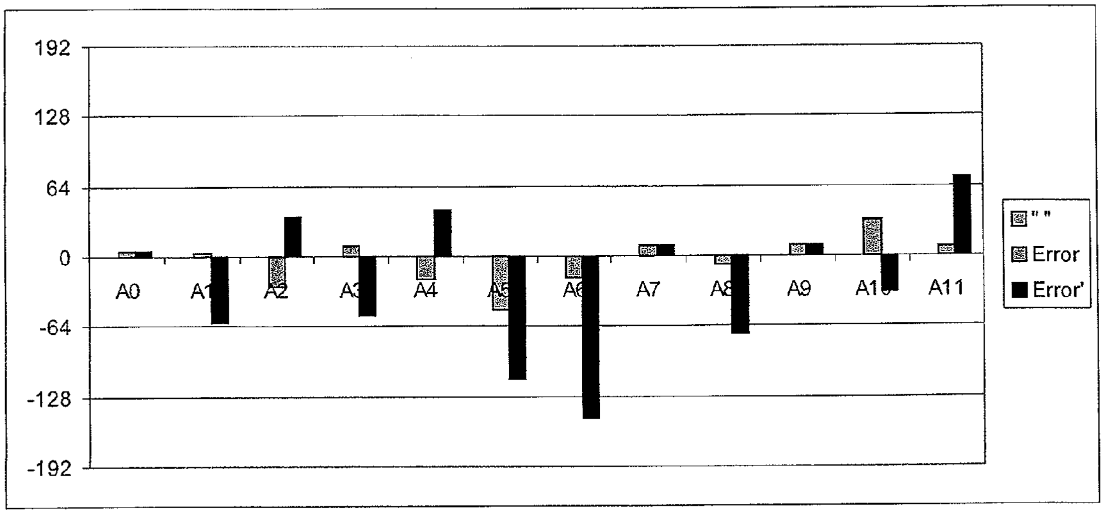
FIG. 13 shows the errors introduced to the PCM stream by the invention.

FIG. 13 shows the errors introduced to the PCM stream by the invention.

Error=Errors due to rounding samples, Error'=Errors due to rounding samples+freq reduction.

Figure 14:
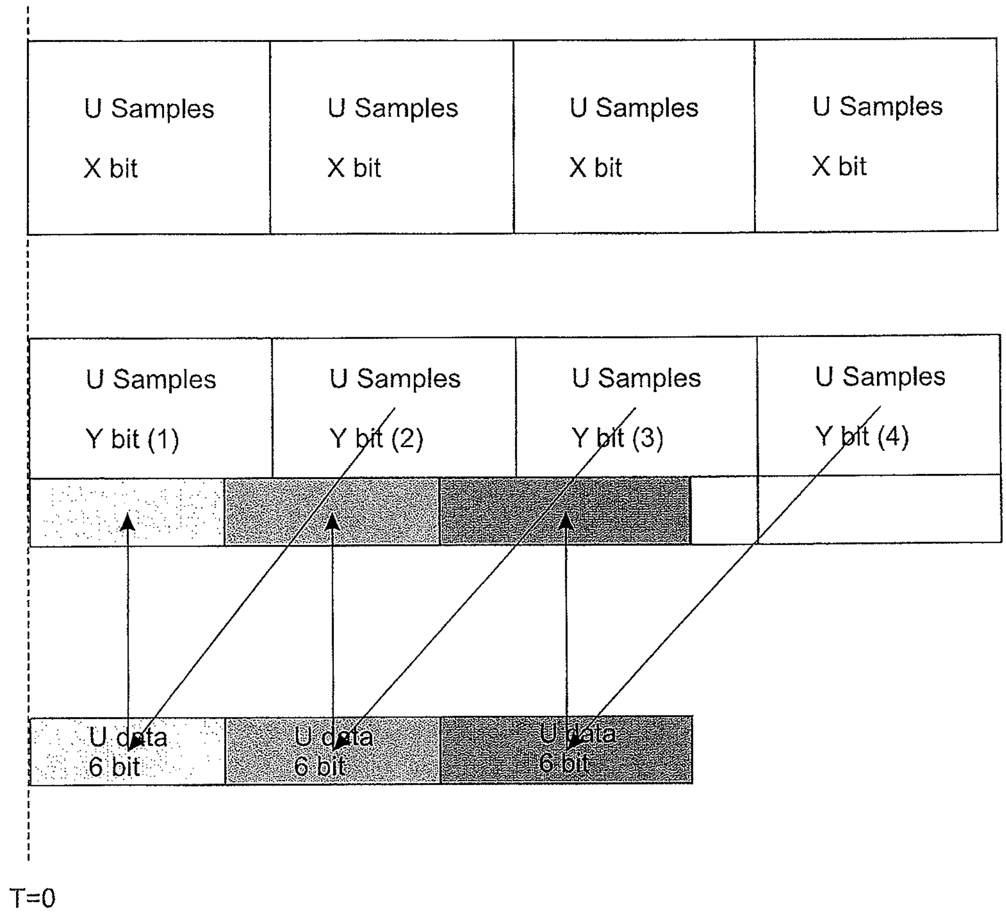
FIG. 14 shows the format of the auxiliary data area in the lower significant bits of the samples of the combined digital data set.

FIG. 14 shows the format of the auxiliary data area in the lower significant bits of the samples of the combined digital data set.

Finally, to enable the decoder to un-mix the mixed audio PCM data, the decoder requires having the duplicate samples of the audio PCM samples BEFORE it receives the audio PCM samples, such that the un-mix-operation can be performed in real-time with the streamed audio PCM. Hereto we need to place this data of a data block (holding duplicate samples of audio samples, sync patterns, length parameter . . . ) into the samples (Z bits) also carrying Audio PCM information related to the previous data block. To give the decoder time to decode these data blocks, they may even end several audio PCM samples before the audio PCM samples which were used to take duplicates from. The number of Audio PCM samples between the end of a Data block and the Audio PCM samples which were used to copy as duplicate samples is the Offset, which is another parameter stored in the data block. Sometimes this offset may be negative, indicating that the position of the duplicated samples in the Audio PCM stream is within the Audio PCM samples used to carry that data block. For the offset we also will use a 12 bit value (signed integer value).

A data block comprises:

1. A Sync pattern
2. A data block length
3. An audio PCM sample offset with reference to the end of that data block.
4. Duplicates of audio PCM samples (one for each channel mixed)

A further advantage is achieved by including correction information that allows a (partial) negation of the error introduced by the equating of samples.

In FIG. 14, at time 0 the encoder starts reading 2× U Xbit samples, which are reduced to Y bits to create the auxiliary data area for holding the data blocks. The sample frequency reduction creates errors, which are approximated and replaced with a list of references to these approximations. Apart from this data—which is effectively compressed—the data block headers (sync, length, offset, . . . etc) are generated resulting in a data block length of U' samples. These data samples are placed within the data section of the first U samples. In a next step the encoder reads U' (<U) samples, resulting in a data block which (uncompressed) requires U samples, but after compression U". Again this data block is attached to the previous data block and in this example (still) uses some samples of the initial U (Xbit) samples. The process of the encoder reading U'· · · ' Xbit samples and generating the corresponding data-block continues till all data has been processed.

Figure 15:
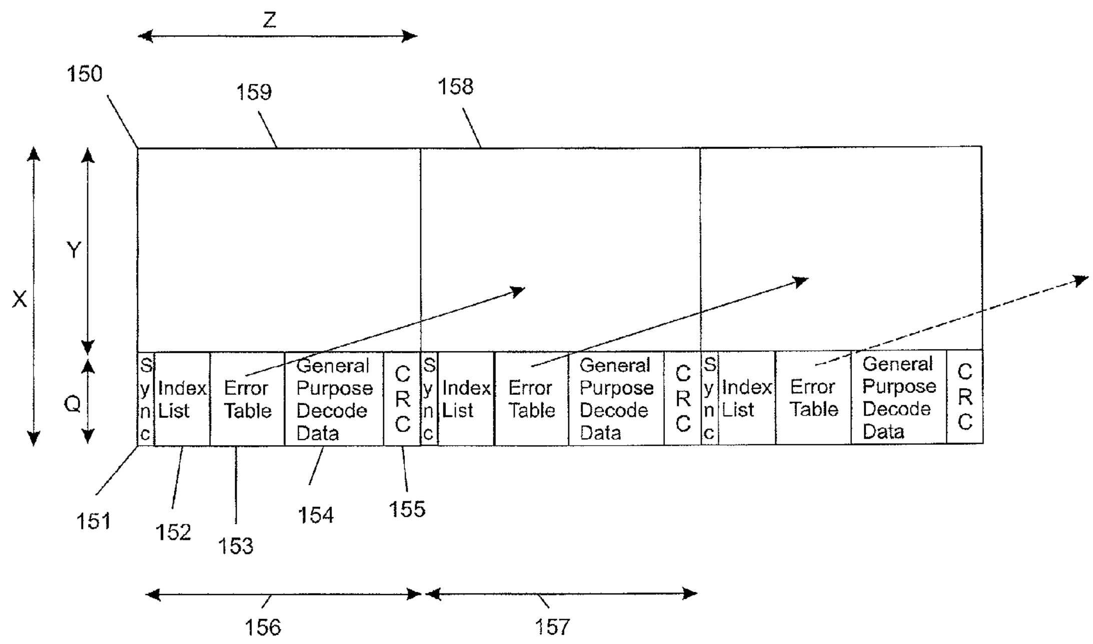
FIG. 15 shows more details of the auxiliary data area.

FIG. 15 shows more details of the auxiliary data area.

The AUROPHONIC Data Carrier Format complies with the following structure;

It is a bit precise audio/data stream 150, typically a PCM stream 150, where the data is divided into sections 158, 159 of Z samples. Each sample in the section 158, 159 consists of X bits. (X typically will be 16 bits for audio CD/DVD data, or 24 bit for Blu-Ray/HDDVD audio data) The most significant bits (Y first bits, for e.g. Blu-Ray typically 18 or 20 bits) hold the audio data (could be PCM audio data), the least significant bits (Q last bits, e.g. for Blu-Ray typically 6 or 4 bits) hold the AURO decoding data.

The AURO additional data as used during decoding in each data block 156, 157 is organized as follows;

It comprises a Sync section 151, a General Purpose Decode Data section 154, optionally an Index List 152 and an Error Table 153, and finally a CRC value 155.

The Sync section 151 is pre-defined as a rolling bit pattern (size depends on the number of Q bits used for the AURO data width). The general purpose data 154 includes information about the length of the AURO data block, the exact offset (relative to the sync position 151) of the first audio (PCM) data 158 on which the AURO decoding data 156 has to be applied, copies of the first audio (PCM) data sample (one for each channel encoded), Attenuation data and other data. Optionally (depending on the AURO quality selection during the encoding process), this AURO decoding data 156, 157 may also include an Index List 152 and an Error table 153 holding approximations of all Errors generated during the encoding step. Further, also optionally, the Index List 152 and Error Table 153 may be compressed. The general purpose decoding data section 154 will indicate if such Index List 152 and Error Table 153 is present, including information about the compression applied. Finally the CRC value 155 is a CRC calculated using both the Audio PCM data (Y bits) and the AURO data (Q bits).

One characteristic of the AURO decoder is its extreme low latency. Just a processing delay of 2 AURO (PCM) samples is required for decoding. The AURO data block 156, 157 information has to be transmitted and processed (e.g. decompressed) prior to transmitting the PCM audio data 158 to which the AURO decoding data has to be applied. As a consequence, the AURO data block 156, 157 (least significant bits) is merged with the Audio PCM data 159 (most significant bits) such that the last AURO data information 154, 155 from one block is never later then the first (PCM) Audio data sample to which that AURO data information applies to.

The decoder implementing the un-mixing operation of the channels uses sync patterns to allow it to locate for instance the duplicate samples and relate them to the matching original samples. These sync patterns can be placed as well in the 6 (X) bits per sample and should be easily detectable by the decoder. A 'sync' pattern can be a repeated pattern of a sequence of several 6 (X) bits long 'keys'. E.g. by having a single bit shifting from the least significant position to the most significant position, or binary represented as: 000001, 000010, 000100, 001000, 010000, 100000. Other bit patterns could be selected based on characteristics of the samples in order to avoid that the sync patterns affect the samples in a perceptible way, or that the samples affect the detection of the sync patterns. As such uniform sync patterns can be defined for all different combinations of sample resolutions. (24/22/2, 24/20/4/, 24/18/6, 24/16/8, 16/14/2, . . . ) These patterns can also be optimized to eliminate the 'noise' generated from the least significant bits of the audio samples, when played by a DVD-Player not using such AURO-Phonic decoder.

Figure 16:
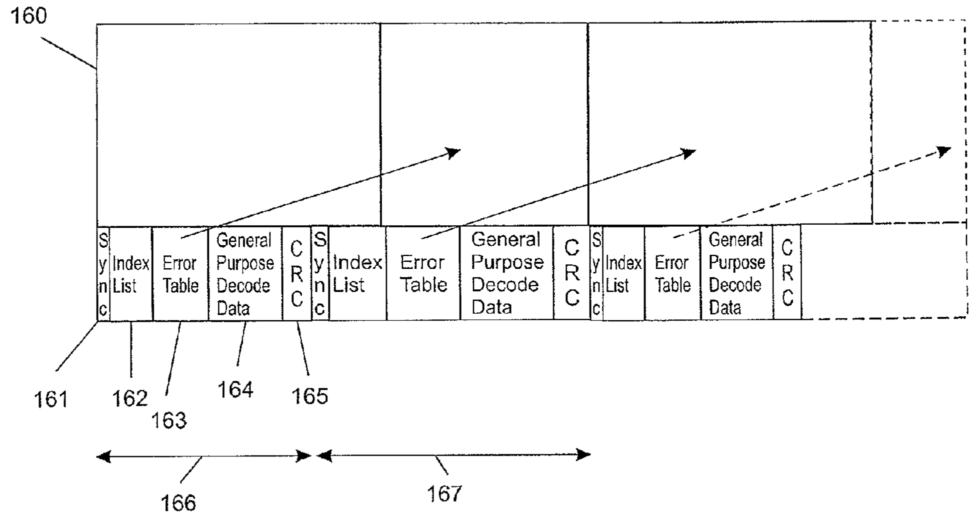
FIG. 16 shows a situation where adaptation leads to variable length AURO data blocks FIG. 17 gives an overview of a combination of the processing steps as explained in previous sections.

FIG. 16 shows a situation where adaptation leads to variable length AURO data blocks. It is further required that the decoder receives the information of the data blocks before it processes the mixed audio samples, since it has to decode the data-block (including de-compression) and needs access to these (approximated) Errors in order to perform the un-mix operation. The Error stream samples (from that $2^{nd}$ block) will be approximated (using K-Median or Facility Location algorithms) with a table containing approximations and a list of references to link every sample of that Error stream section to an element of that approximation table. This list of references makes up the approximated Error stream. Both that list and the table with approximation values are compressed by a compressor, the other remaining elements of the data structure are defined by a formatter (like sync pattern, data block length, offset, duplicate audio samples, attenuation, etc. . . . ) such that (most likely) one will end up with less then U data samples, a number of samples which we will refer to as W (W<=U). One may expect that value W be typically 20 to 50% smaller than U. Next this data-block is placed in the data-space of the first U samples by the formatter. This guarantees that these data samples will be available to the decoder before it receives the matching audio samples. As we may have saved on data samples, (U−W) for later use, the next audio section to be encoded (this is mixing and error approximation) should contain only W audio samples (<=U). Even if the data block for this section (of W audio samples) should require U data samples, it is guaranteed to have the end of this data block before the first audio sample it refers to. Furthermore, because of a smaller number of audio samples (W<=U) we may expect the approximation of the sample frequency reduction Error to be better, since a smaller number of Error values has to be approximated. As such the gain of the compression is used by a better approximation of the next section of audio samples. Again, this last section of the data block could be smaller than U, e.g. W' (<=U) such that the next number of audio samples to be encoded could in turn also be limited to W'.

It is further understood that the size of the data block will vary, depending on the compression quality. As a consequence the offset parameter (part of the data block structure) is an important parameter to link the size varying data blocks to the corresponding first audio sample. The length of the data block itself matches the number of audio samples required during decoding, starting from the first audio sample which was linked to the data block with the offset parameter. This offset parameter may be even increased if required (and the data block shifted more backward in time) when in certain cases the decoder would need more time to start decoding of the data block relative to the moment it receives the first matching audio sample. It is further understood that the decoding of the data block should be executed at least in real time by the decoder, since such delays may not increment.

Another feature of this invention is that the decoder will stay easily in sync with the sync references and furthermore automatically detect the used encoding format (detect the numbers of bits of an audio sample used for sync patterns/sample duplicates). Hereto we include the number of samples between each first word of a sync pattern as part of the coded data. We also require the sync patterns to repeat after at most 4096×2 (2=the number of channels mixed) samples. This reduces the maximum length of a data block (sync pattern+sample duplicate data) to 4096×2 samples requiring 12 bits to store this length of each data block. Using this info, and given the different coding resolutions e.g. for 24 bit PCM samples: 22/2, 20/4, 18/6, 16/8 the decoder should be able to auto-identify the coding format, detect the sync patterns and their repetitions easily.

The embedding of auxiliary data in the data area formed by the lower significant bits of the samples can be used independently of the combining/unraveling mechanism. Also in a single audio stream this data area can be created without audibly affecting the signal in which the auxiliary data gets embedded. The embedding of error approximations for errors due to sample frequency reduction (equating of samples) is still beneficial if no combining takes place because it also allows the reduction of the sample frequency (thus saving storage space) yet allowing a good reconstruction of the original signal using the error approximations as explained to combat the effects of sample frequency reduction.

Figure 17:
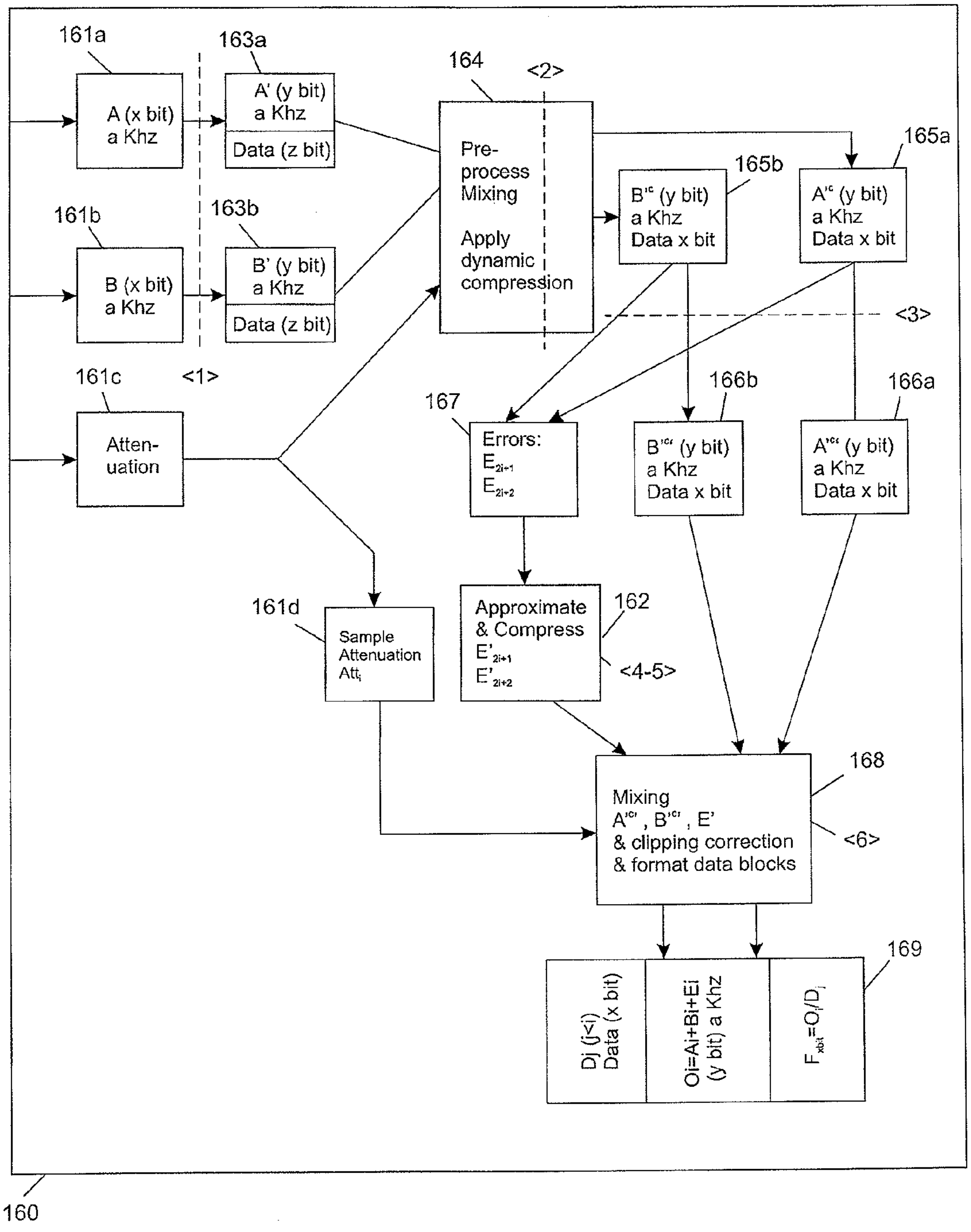

FIG. 17 show the encoding including all improvements of the embodiments.

The blocks shown correspond both to the steps of the method and equally to hardware blocks of the encoder and show the flow of data between the hardware blocks as well as between the steps of the method.

Encoding Processing Steps.

In the first step the Audio streams A, B, are first reduced by rounding audio samples (24→18/6) to A', B'.

In the second step, the reduced streams are pre-mixed (using attenuation data) applying dynamic compression on these streams to avoid audio clipping ($A'^{c}$, $B'^{c}$)

In the third step the sample frequency is reduced by a factor equal to the number of channels mixed ($A'^{cr}$, $B'^{cr}$) introducing an Error stream E.

In the fourth step the error stream E is approximated by E': using $2^{(z-1)}$ centers (e.g. K-Median approximation) and a reference list to these centers.

In the fifth step the table and references are compressed, attenuation sampled (start of audio samples), block headers (sync, length, . . . , . . . , crc) are defined.

In the sixth step the streams ($A'^{cr}$, $B'^{cr}$, E') are mixed including final check against clipping (audio overshooting)—this check may require minor changes.

In the seventh step the data block section (6 bit samples) is merged with audio samples.

FIG. 17 gives an overview of a combination of the processing steps as explained in previous sections. It is understood that this process of encoding works easiest when applied in an off-line situation, the encoder having access to samples of corresponding sections of all streams it has to process anytime. So, it is required that sections of the audio streams are at least temporarily stored e.g. on a hard disk such that the encoder process can seek (back and forth) to use the data it requires for processing that section. In the explanation of FIG. 17 a case of a 24 bit sample (X/Y/Z)=(24/18/6) being divided in a 18 bit sample value and a 6 bit data value which is part of the auxiliary data area holding the control data and seed values, is being used as an example.

The block length—in order for generalization—will be referred to as U.

A first step <1> of the encoding process is (as explained in the section about the basic technique) the reduction on both stream A 161*a* and stream B 161*b* of the sample resolution for example from 24 to 18 bits by the sample size reducers, by rounding each sample to its nearest 18 bit representation. These streams 163*a*, 163*b* which are the result of this rounding are referred to as stream A' 163*a* and stream B' 163*b*. In parallel the attenuation is determined by an attenuator controller which receives a desired attenuation value 161*c* from an input.

The second step <2> is a mixing simulation on these streams 163*a*, 163*b* by an attenuation manipulator to analyze if mixing would cause clipping. If it is required to attenuate one stream 163*b*, typically the $3^{rd}$ dimension audio stream in case of AURO-PHONIC encoding, before mixing, this attenuation should be taken into account in this mixing simulation by the attenuation manipulator. If despite this attenuation, mixing both (96 kHz) streams 163*a*, 163*b* would generate clipping, this step of the encoding process performed by the attenuation manipulator will perform a smooth compression (gradually increase attenuation of the audio samples towards the clipping point and next gradually decrease it). This compression may be applied to both streams 163*a*, 163*b* by the attenuation manipulator, but this is not necessary, since (more) compression on one stream 163*b* could also eliminate this clipping. When applied to these streams A' 163*a* and stream B' 163*b*, new stream $A'^{c}$ 165*a* and stream $B'^{c}$ 165*b* are generated by the attenuation controller. The effect of this attenuation to prevent clipping will be persistent in the final mixed stream 169, as well as in the unmixed streams. In other words, the decoder will not compensate for this attenuation to generate the original stream A' 163*a* or original stream B' 163*b*, but its target will be to generate $A'^{c}$ 165*a* and $B'^{c}$ 165*b*.

During mastering of such (Aurophonic) recordings, the recording engineer can define—if needed—the attenuation level 161*c* and provide this via an input to the attenuation controller to control the attenuation of the second stream 163*b* (typically the $3^{rd}$ dimension audio stream) which is desired when down-mixed to a 2 dimensional audio reproduction.

In the next step <3> the sample Frequency is reduced by the frequency reducer by a factor equal to the number of channels mixed ($A'^{ct}$, $B'^{ct}$) introducing an Error stream E 167. The frequency reduction can be performed for examples as explained in FIGS. 2 and 3, or 6 and 7.

In the next step <4> the error stream E167 is approximated by E' 162 generated by an error aproximator: using $2^{(z-1)}$ centers (e.g. K-Median approximation) and a reference list to these centers.

In the section of advanced encoding/decoding, it was explained that errors 167 (due to sample frequency reduction) in the mixing and un-mixing operation could be avoided on the condition that this Error stream 167 would be approximated without errors. In this particular example (X/Y/Z)=(24/18/6) and V=32 ($2^{(z-1)}$) approximations, there most likely would be no errors (apart from the limitations due to the 12 bit representation of the Errors) when we had only V samples in a data block such that there is a one to one mapping of these Errors to these 'approximations'. On the other end we also defined the max length U of the data block, which in any circumstance would guarantee that the Error reference list and approximation table would be 'encode-able' in such data block. Therefore this step of the encoding will initially require a number of U samples from both streams $A'^{ct}$ 165*a* and $B'^{ct}$ 165*b* and from the Error stream E 167.

First the width of the Error sample is selected (this is the number of bits used for representing this error information). Since the basic stream is PCM data originating from an audio recording, one may expect the Errors or differences between 2 adjacent samples relative small compared to the Max (or Min) sample. At (e.g.) a 96 kHz audio signal, this Error could be relatively large only when the audio stream contains signals with very high frequencies. As explained before, in this description, a 24 bit PCM stream is used, reduced to 18 bits for audio and creating room for 6 data bits per sample. These data bits are used, as explained in the basic technique to store the sync pattern, the length of a data block, the offset, parameters to be defined, 2 duplicated samples (when 2 channels were mixed), a compressed 'index list to Errors', compressed Error table and checksum. The 'index list to Errors', and the Error table will be explained below. In the example of 24/18/6, 6 bits per sample are available for the auxiliary data area and the 6 bits per sample could theoretically define a table with $2^6$=64 Errors where needed. Within this example of 24/18/6, the Error representations will be restricted to a signed 2×6 bit integer number.

Part of the contents of a data block in the auxiliary data area with U samples of 6 bit (24/18/6—for each sample of the data block, there is one audio (mixed) sample), is a table with approximations of the Errors due to sample frequency reduction of these streams. As mentioned before an Error will be approximated using 2 data samples of 6 bits. Since there is not enough 'room' to store an approximation for every Error, a limited numbers of Error' values needs to be defined, which—as close as possible—approach all these Errors. Next a list is created including references to these approximated Errors' for every element of the Error 'stream' in the data block in the auxiliary data area. Apart from the sync, the length, offset, sample duplicates etc. . . . room is needed to store a table with approximated Errors' in the data block. This table can be compressed, to limit the memory used for the data block, and furthermore the list of references can be compressed as well.

First the way to approximate these elements from the Error stream will be explored.

What needs to be defined is a number K of values, such that every element of the stream (but typically a section of that stream to which the data in the data lock corresponds) can be associated with one of these values and such that the total sum of the errors (this is the absolute difference of each element of the Error stream with its best (nearest) approximated value Error') is as small as possible. Other 'weighting' factors could be used instead of the absolute value, like the square of this absolute value or a definition taking perceptual audio characteristics into account. Finding such K numbers out of a series of values—in this case defined as Errors due to sample frequency reduction of the 2 mixed channels—is defined as the K-Median objective. Groups of elements from the Error stream need to be clustered, and K centers need to be identified so that the sum of distances from each point to its nearest center is minimized.

Similar problems and their solutions are also known in literature as Facility Location algorithms. Furthermore within this context 'streaming' solutions as well as non-streaming solutions need to be considered. The former would mean the 'encoder' has only one time and one pass access to the life (and real time) generated Errors resulting from the mixing of life audio streams. The latter (non-streaming) would mean an encoder has 'off-line' and continuous access to the data it requires for processing. Due to the structure of the output digital data stream (an audio PCM stream with 18 bit audio samples and 6 bit data) a data block from the auxiliary data area is send out prior to the audio samples it corresponds to, a situation is created for non-streaming use case of K-Median or Facility Location algorithms. The objective of this invention is not to define a new Data Clustering algorithm, since many of these are available in the public domain literature, but rather to refer to these as a solution for the skilled person for implementation. [e.g. see Clustering Data Streams: Theory and Practice, IEEE TRANSACTIONS ON KNOWLEDGE AND DATA ENGINEERING, VOL. 15, NO. 3, MAY/JUNE 2003].

Once these K centers or error approximations have been defined, a list is generated where the L elements of the Error stream from the mixing are replaced by L references to elements in that table, containing the K approximations (or centers). Since 6 bits of data are available for every audio sample, one could—for a certain section of an Error stream—define K=64 different approximations for all different Errors in that section. One then could rely on lossless compression of that list of L references, such that after compression one ends up with M×6 bit data samples, and N 'free' 6 bit data samples with L=M+N. The free space of the auxiliary data area would be used to store the Error approximations as well as the sync pattern, the length of the data block, etc. . . . . However, since the values in this list of L references could be a series of true random numbers, one should not rely on the compression of this list, but rather guarantee that this list is compressible. Therefore, in a case of X/Y/Z with in this example X=24, Y=18, Z=6, no more than $32=2^{(Z-1)}$ approximations are used. As such, only (Z−1) bits are required to refer to this table, and it can easily be proven that such a list of references is compressible; 5*6 bit data samples can hold 6 references to this table (each needing 5 bits). In the case of 24/18/6, as explained in the section of the basic technique, at least a total of 86 data samples are needed to store all data not including the list of references. (6 (6 bit) samples for Sync, 2 (6 bit) samples for data block length, 2 (6 bit) samples for offset, 6 (6 bit) samples for 2 audio sample duplicates each 18 bit, 2 (6 bit) for Attenuation, 2 (6 bit) data to be defined, at most 64 (6 bit) samples for 32 error approximations . . . if uncompressible, 2 (6 bit) samples for CRC). Given a compression ratio of at least 6 compressed to 5 (delivering 1 free data sample), at most 6×86=516 samples are needed. This total also defines the maximum length of a data block for this mode of 24/18/6. Restricting the number of approximations e.g. to 16, leads to a reduction of the 86 total to 54, the minimum compression ratio of the reference list of at least 6 compressed to 4 and the max length of the data block to 3×54=162 data samples. Or, by extending the width of the errors to 3×6 bit, creating 118 data sample to store all data except the list of references. (this would require a total of 708=6×118) However, in most cases a compression further compressing this data is realistic as the above considered only a worst case scenario; e.g. compression by 25% (4 bits reduced to 3 bits) which is a typical ratio for the error approximation table. For an approximation with 32 error approximations, this extra ratio would decrease the data block length by more then 50%; the 64 data samples from the (32) error approximations would be reduced to 48 data samples, such that the total (without the list of references) is reduced to 70. Further an additional 20%-25% compression on the list of references, would compress this list from 6 bits to 5 bits, further down to 4 bits, resulting in a total of a data block length of 3×70=210 data samples. The result is that the error stream of 210 Errors from sample reduction of the mixed audio streams, can be approximated by a stream of references to 32 Error approximations.

For a 24/18/6 case with only 16 Error approximations, and taking comparable compression ratios, results in an Error stream requiting 3×46=138 data samples.

To conclude—based on the above examples—but not restricted to these example—the compression scheme introduced here, enables the error stream to be approximated in such a way that this approximation can be taken into consideration at the time of mixing the sample frequency reduced audio streams, which will substantially reduce the errors due to this sample frequency reduction. The use of these compressed error approximations allows the reconstruction of the two mixed PCM streams with remarkable accuracy, making the error introduced by the combining and unraveling of the two PCM stream largely imperceptible.

It is further required that the decoder receives the information of the data blocks before it processes the mixed audio samples, since it has to decode the data-block (including de-compression) and needs access to these (approximated) Errors in order to perform the un-mix operation. As such, in a first phase of this encoding step, a second block of a number of U samples (=a section) from stream A'ᶜᵗ 165*a* and B'ᶜᵗ 165*b* and from the Error stream E 167 will be required too. The Error stream samples (from that $2^{nd}$ block) will be approximated (using K-Median or Facility Location algorithms) with a table containing V (=32) 12 bit approximations and a list of references to link every sample of that Error stream section to an element of that approximation table. This list of references makes up the approximated Error stream E' 162.

In the combining step <6> the streams ($A'^{c}$, $B'^{ct}$, E') are mixed by a combiner/formatter. This combiner/formatter comprises a further clipping analyzer to perform a final check against clipping (audio overshooting)—this check may require minor changes. The combiner/formatter adds additional data such as attenuation, seed values and error approximations to the auxiliary data area of the appropriate data block in the combined data stream created by the sample size reducers, and provides the output stream 169 comprising the combined streams, the data block section merged with audio samples to an output of the encoder.

Reduction of Errors that would be Introduced by Clipping.

Another aspect of this invention is the pre-processing of the audio streams prior to being effectively mixed. Two or more streams could generate clipping when these signals are mixed together. In such event, a pre-processing step includes a dynamic audio compressor/limiter on one of the channels being mixed or even on both channels. This can be done by gradually increasing the attenuation before these specific events, and after those events gradually decrease the attenuation. This approach would mainly be applied in a non-streaming mode of the encoding processor, since it requires (ahead of time) sample values which would generate these overshoots/clipping. These attenuations could be processed on the audio streams themselves and as such avoid clipping in a way that—when un-mixed—these compressor effects will still be part of the un-mixed streams. Apart from avoiding clipping of (mixed) audio, the down-mixed 3D to 2D audio recording has to be useable when no decoder (as described in this invention) is present. For that reason a dynamic audio signal compression (or attenuation) is used on the mixed audio stream to reduce the additional audio (from the $3^{rd}$ dimension) interfering too much with the basic 2 dimensional audio, but by storing these attenuation parameters the inverse operations can be performed after unmixing so that the proper signal levels are restored. As mentioned above, the data block structure of the auxiliary data area formed by the lower significant bits of the samples contains a section to hold this dynamic audio compression parameter (attenuation) of at least 8 bits. Further, from the analysis (see Sample Frequency Reduction Error Correction), it can be concluded that a maximum length of a data-block for a typical case of 24/18/6 with an error table of 32 elements and 12 bit error width was appr. 500 samples. At a sampling rate of 96 kHz such a section is about 5 msec. of audio, which thus becomes the timing granularity of the attenuation parameters. The attenuation value itself is represented with an 8 bit value, when different dB attenuation levels are assigned to each value (e.g.: 0=0 dB, 1=(−0.1) dB, 2=(−0.2) dB . . . ) one can rely on these values and time-steps, to implement a smooth compression curve, which can be used inversely during the decoding operation to restore the proper relative signal levels.

The storage of attenuation values in the lower significant bits of an audio stream can of course also be applied to a single stream where some bits of resolution are in that case sacrificed to increase the overall dynamic range of the signal in the stream. Alternatively, in a mixed stream multiple attenuation values can be stored in the data block so that each data stream has an associated attenuation value thus defining levels of playback for each signal individually, yet retaining resolution even at the low signal levels for each signal.

Figure 18:
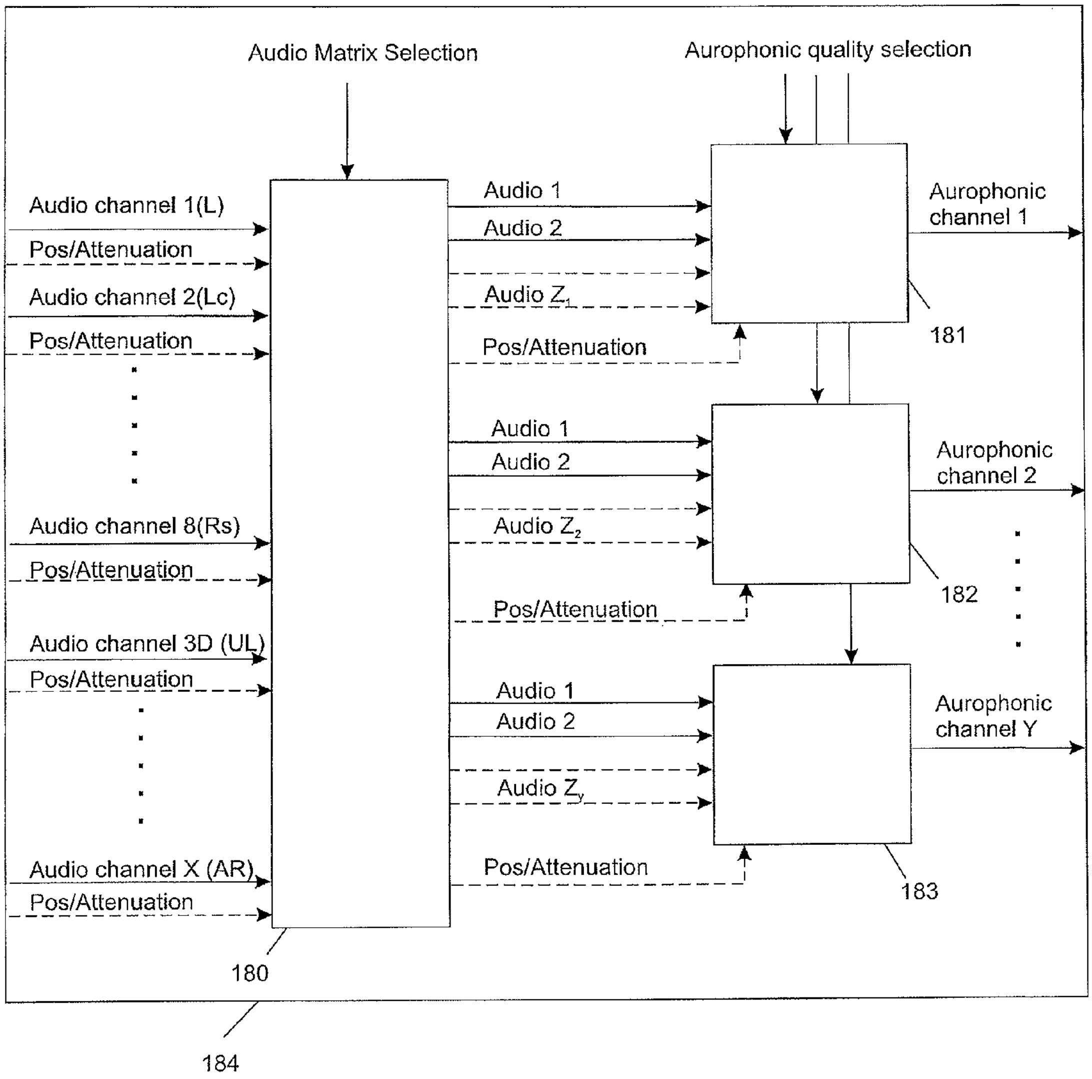
FIG. 18 shows an Aurophonic Encoder Device

In addition the attenuation parameters can be used to mix 3 dimensional audio information in such a way that consumer not using these 3 dimensional audio information does not hear the additional 3 dimensional audio signal as this additional signal is attenuated relative to the main 2 dimensional signal, while knowing the attenuation value allows a decoder that retrieves the additional 3 dimensional signal to restore the attenuated 3 dimensional signal component to its original signal level. Typically this requires a $3^{rd}$ dimensional audio stream to be attenuated for instance by 18 dB prior to mixing it into the 2 dimensional audio PCM stream to avoid this audio information to 'dominate' the 'normal' audio PCM stream. This requires an additional (8 bit) parameter to define the attenuation (for each section of the stream—defined as the length of the data block) used on a 3 dimensional audio stream before it was mixed with the other stream. The 18 bit attenuation can be negated after decoding by amplifying the $3^{rd}$ dimensional audio stream FIG. 18 shows an AUROPHONIC Encoder Device The AUROPHONIC Encoder device 184 comprises of multiple instances of the AURO Encoder 181, 182, 183, each mixing 1 or more audio PCM channels using the technique described in FIGS. 1-17. For every Aurophonic output channel one AURO encoder 181, 182, 183 instance is activated. When only 1 channel is provided there is nothing to mix and the encoder instance should not be activated.

The inputs of the Aurophonic Encoder 184 are multiple audio (PCM) channels (Audio channel 1 through audio channel X). For each channel, information (pos/attenuation) is attached regarding its position (3D) and its attenuation used when down-mixed into lesser channels. Other inputs of the Aurophonic Encoder consist of the Audio Matrix Selection 180 which decides which Audio PCM channels are down-mixed into what Aurophonic output channels) and the Aurophonic Encoder Quality indicator which is provided to each AURO encoder 181, 182, 183.

Typical input channels of the 3D encoder are L (Front Left), Lc (Front Left Center), C (Front Center), Rc (Front Right Center), R (Front Right), LFE (Low Frequency Effects), Ls (Left Surround), Rs (Right Surround), UL (Upper Front Left), UC (Upper Front Center), UR (Upper Front Right), ULs (Upper Surround Left), URs (Upper Surround Right), AL (artistic-left), AR (artistic-right) . . . .

Typical output channels as provided by the encoder and being compatible with a 2D reproduction format are AURO-L (left) (Aurophonic channel 1), AURO-C (center) (Aurophonic channel 2), AURO-R (right) (Aurophonic channel . . . ), AURO-Ls (left surround) (Aurophonic channel . . . ), AURO-Rs (right surround) (Aurophonic channel . . . ), AURO-LFE (Low Frequency Effects) (Aurophonic channel Y)

Example of AURO Encoded channels as provided by the output of encoder 184: (AURO-L, AURO-R, AURO-Ls, AURO-Rs).

AURO-L may contain both the original L (Front Left), UL (Front Upper Left) & AL (Artistic-Left) PCM audio channel, AURO-R would be similar but for the front right audio channels, AURO-Ls holds the Ls (Left Surround) & ULs (Upper Left Surround) audio PCM channels, AURO-Rs the equivalent right channels.

Figure 19:
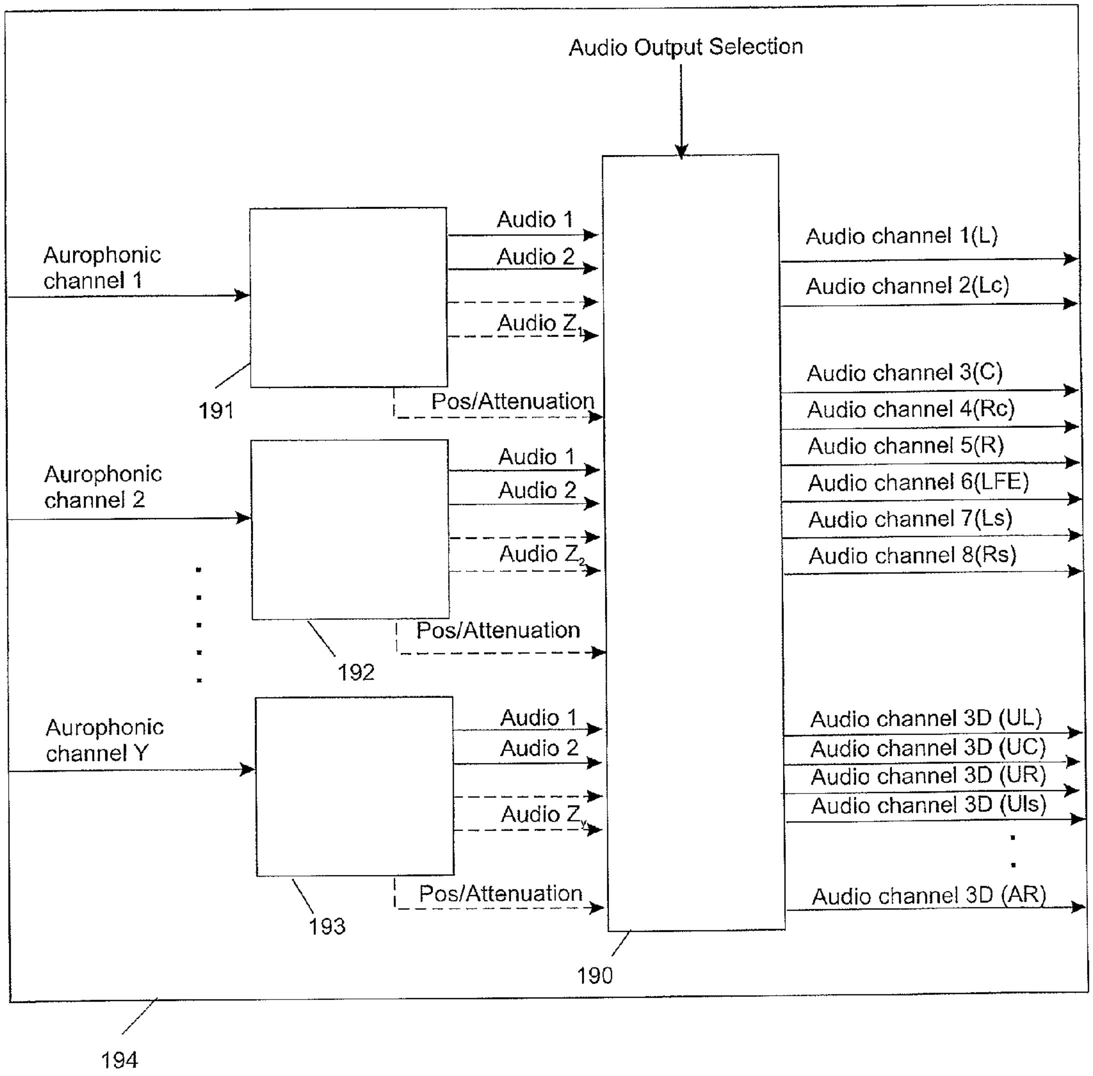
FIG. 19 shows an Aurophonic Decoder Device

FIG. 19 shows an Aurophonic decoder device.

The AUROPHONIC Decoder 194 comprises multiple instances of the AURO Decoder 191, 192, 193, un-mixing 1 or more audio PCM channels using a technique described in the FIGS. 5 and 10. For every AURO input channel one AURO decoder 191, 192, 193 instance is activated. When an AURO Channel consists of a mix of only 1 audio channel, the decoder instance should not be activated.

The inputs of the AUROPHONIC Decoder receive Aurophonic (PCM) channels Aurophonic channel 1 . . . Aurophonic channel X. For each channel Aurophonic channel 1 . . . Aurophonic channel X, a auxiliary data area decoder being part of the decoder, will auto-detect the presence of the sync patterns of the AURO data block of the PCM channels. When consistent syncs are detected, the AURO decoder 191, 192, 193 starts to un-mix the Audio parts of the AURO (PCM) channels and, at the same time, decompressing (if required) the Index List and Error Table, and applying this correction to the un-mixed audio channels. The AURO data also includes parameters like attenuation (compensated for by the decoder) and 3D position. 3D position is used in the audio Output Selection Section 190 to redirect the un-mixed audio channel to the correct output of the decoder 194. The user selects the group of audio output channels.

Figure 20:
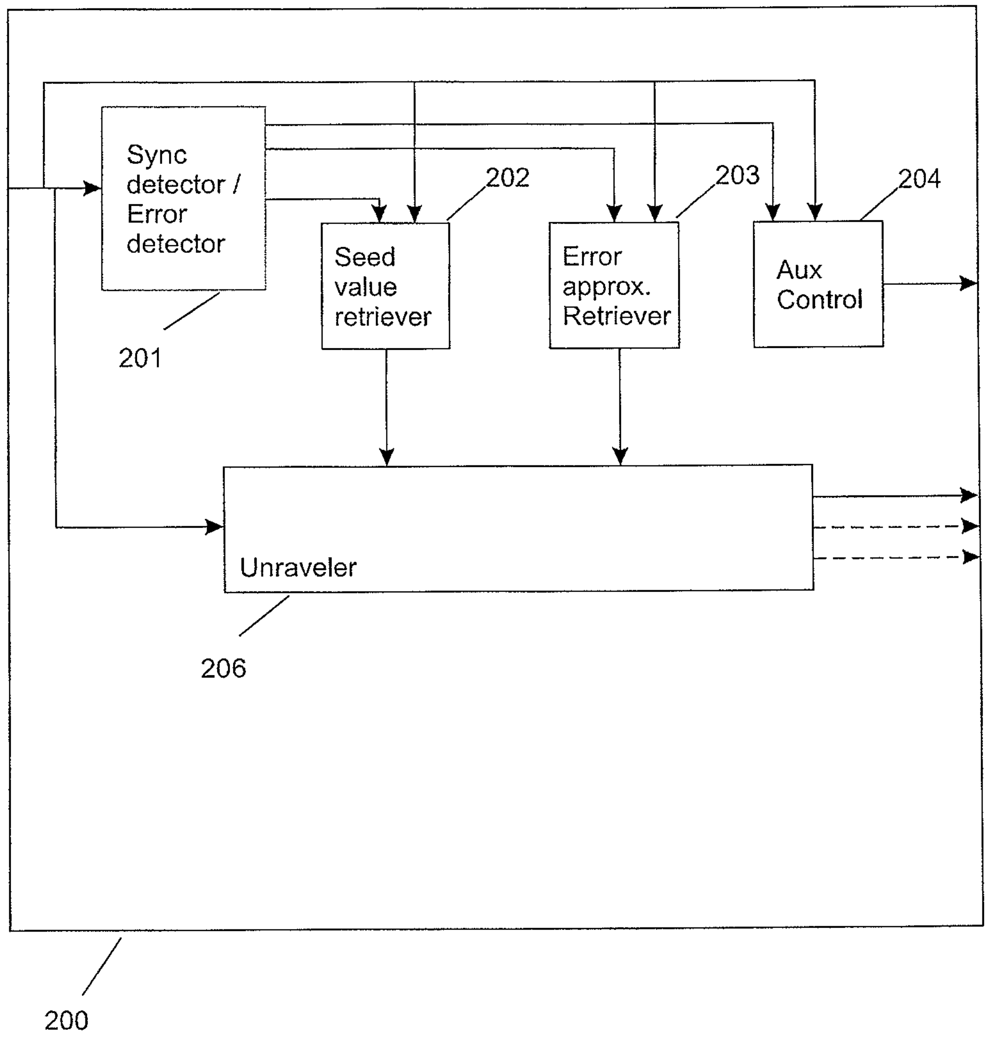
FIG. 20 shows a decoder according to the invention.

FIG. 20 shows a decoder according to the invention.

Now that all aspects of the invention have been explained a decoder can be described, including the advantageous embodiments.

The decoder 200 for decoding the signal as obtained by the invention should preferably automatically detect if 'audio' (e.g. 24 bit) has been encoded according to the techniques detailed in previous sections.

This can be achieved for instance by a sync detector 201 that searches the received data stream for a synchronizing pattern in the lower significant bits. The sync detector 201 has the ability to synchronize to the data blocks in the auxiliary data area formed by the lower significant bits of the samples by finding the synchronization patterns. As explained above the use of synchronization patterns is optional but advantageous. Sync patterns can, for example for a 24 bit sample size, be 2, 4, 6, or 8 bit (Z-bit) wide, and 2, 4, 6 or 8 samples long. (2 bits: LSB=01, 10; 4 bits: LSB=0001, 0010, 0100, 1000; 6 bits: 000001, . . . , 100000; 8 bits: 00000001, . . . , 10000000). Once the sync detector 201 has found any of these matching patterns, it 'waits' till a similar pattern is detected. Once that pattern has been detected, the sync detector 201 gets in a SYNC-candidate-state. Based on the detected synchronizing pattern the sync detector 201 can also determine whether 2, 4, 6 or 8 bits were used per sample for the auxiliary data area.

On the $2^{nd}$ sync pattern, the decoder 200 will scan through the data block to decode the block length, and verify with the next sync pattern if there is a match between the block length and the start of the next sync pattern. If these both match, the decoder 200 gets in the Sync-state. If this test fails, the decoder 200 will restart its syncing process from the very beginning. During decode operation, the decoder 200 will always compare the block length against the number of samples between the start of each successive sync block. As soon as a discrepancy has been detected, the decoder 200 gets out of Sync-state and the syncing process has to start over.

As explained in FIGS. 15 and 16, an error correction code can be applied to data blocks in the auxiliary data area as to protect the data present. This error correction code can also be used for synchronization if the format of the Error Correction Code blocks is known, and the position of the auxiliary data in the Error Correction Code blocks is known. Hence, in FIG. 20 the sync detector and error detector are shown as being combined in block 201 for convenience, but they may be implemented separately as well.

The error detector calculates the CRC value (using all data from this data block, except syncs) and compares this CRC value with the value found at the end of the data block. If there is a mismatch, the decoder is said to be in CRC-Error state The sync detector provides information to the seed value retriever 202, the error approximation retriever 203 and the auxiliary controller 204 which allows the seed value retriever 202, the error approximation retriever 203 and the auxiliary controller 204 to extract the relevant data from the auxiliary data area as received from the input of the decoder 200.

Once the sync detector is sync-ed to the data block sync headers, the seed value retriever scans through the data in the data block to determine the offset, i.e. the number of samples between the end of a data block and the first duplicated audio sample (this number could theoretically be negative) and to read these duplicated (audio) samples.

The seed value retriever 202 retrieves one or more seed values from the auxiliary data area of the received digital data set and provides the retrieved seed values to the unraveler 206. The unraveler 206 performs the basic unraveling of the digital data sets using the seed value(s) as explained in FIGS. 5 and 9. The result of this unraveling is either multiple digital data sets, or a single digital data set with one or more digital data sets removed from the combined digital data set. This is indicated in FIG. 20 by the three arrows connecting the unraveler 206 to outputs of the decoder 200.

As explained above, using the error approximations is optional, as the audio as unraveled by the unraveler 206 is already very acceptable without using the error approximations to reduce the errors introduced by the equating performed by the encoder.

The error approximation retriever 203 will decompress the reference list and the approximation table if required. If the error approximations are to be used to improve the unraveled digital data set(s) the unraveler 206 applies the error approximations received from the error approximation retriever 203 to the corresponding digital data set(s) and provides the resulting digital data set(s) to the output of the decoder.

As long as the decoder 200 stays synced to the data-block headers, the error approximation retriever 203 will continue decompressing the reference lists and the approximation tables, and supply these data to the unraveler 206 to un-mix the mixed audio samples according to C=A"+B"+E' or C−E'=A"+B" The unraveler 206 uses the duplicated audio samples to start un-mixing into A" samples and B" samples. For a combined digital data set in which two digital data sets have been combined, the even indexed samples of $A''_{2i}$ match with these of $A'_{2i}$ and $A''_{2i+1}$ are corrected by adding $E'_{2i+1}$. Similarly, the odd indexed samples of $B''_{2i+1}$ match with these of $B'_{2i+1}$ and $B''_{2i+2}$ are corrected by adding $E'_{2i+2}$. The inverse attenuation is applied on the second audio stream (B), and both audio samples (A' & B') are converted to their original bit width by shifting these samples Z bits to the left while zeros are filled in at the least significant bit side. The reconstructed samples are sent out as independent uncorrelated audio streams.

Another optional element of the decoder 200 is the auxiliary controller 204. The auxiliary controller 204 retrieves the auxiliary control data from the auxiliary data area and processes the retrieved auxiliary control data and provides the result, for instance in the form of control data to control mechanical actuators, musical instruments or lights, to an auxiliary output of the decoder.

As a matter of fact, the decoder could be stripped of the unraveler 206, the seed value retriever 202 and error approximation retriever 203 in case the decoder only needs to provide the auxiliary control data, for instance to control mechanical actuators in way that corresponds to the audio stream in the combined digital data set When the decoder gets in a CRC-Error state, the user can define the behavior of the decoder, e.g. he may want to fade out the second output to a muting level, and once the decoder resolves from its CRC-Error state, fade in the second output again. Another behavior could be to duplicate the mixed signal to both outputs, but these changes of audio presented at the outputs of the decoder should never cause undesired audio plopping or cracking.

The invention claimed is:

1. A method for combining a first digital data set (20) of samples ($A_0$, $A_1$, $A_2$, $A_3$, $A_4$, $A_5$, $A_6$, $A_7$, $A_8$, $A_9$) with a first size and a second digital data set (30) of samples ($B_0$, $B_1$, $B_2$, $B_3$, $B_4$, $B_5$, $B_6$, $B_7$, $B_8$, $B_9$) with a second size into a third digital data set (40) of samples ($C_0$, $C_1$, $C_2$, $C_3$, $C_4$, $C_5$, $C_6$, $C_7$, $C_8$, $C_9$) with a third size smaller than a sum of the first size and the second size, comprising the steps of:

equating a first subset of samples ($A_1$, $A_3$, $A_5$, $A_7$, $A_9$) of the first digital data set (20) to neighboring samples of a second subset of samples ($A_0$, $A_2$, $A_4$, $A_6$, $A_8$) of the first digital data set (20) where the first subset of samples ($A_1$, $A_3$, $A_5$, $A_7$, $A_9$) and the second subset of samples ($A_0$, $A_2$, $A_4$, $A_6$, $A_8$) are interleaved, equating a third subset of samples ($B_0$, $B_2$, $B_4$, $B_6$, $B_8$) of the second digital data set (30) to neighboring samples of a fourth subset of samples ($B_1$, $B_3$, $B_5$, $B_7$, $B_9$) of the second digital data set (30) where the third subset of samples ($B_0$, $B_2$, $B_4$, $B_6$, $B_8$) and the fourth subset of samples ($B_1$, $B_3$, $B_5$, $B_7$, $B_9$) are interleaved, where the samples of the fourth subset ($B_1$, $B_3$, $B_5$, $B_7$, $B_9$) and the second subset of samples ($A_0$, $A_2$, $A_4$, $A_6$, $A_8$) have no samples corresponding in time, creating the samples ($C_0$, $C_1$, $C_2$, $C_3$, $C_4$, $C_5$, $C_6$, $C_7$, $C_8$, $C_9$) of the third digital data set (40) by adding the samples ($A_0''$, $A_1''$, $A_2''$, $A_3''$, $A_4''$, $A_5''$, $A_6''$, $A_7''$, $A_8''$, $A_9''$) of the equated first digital data set to the, in the time domain, corresponding samples ($B_0''$, $B_1''$, $B_2''$, $B_3''$, $B_4''$, $B_5''$, $B_6''$, $B_7''$, $B_8''$, $B_9''$) of the equated second digital data set, embedding a first seed sample ($A_0$) of the first digital data set (20) and a second seed sample ($B_1$) of the second digital data set (30) in the third digital data set (40).

2. A method as claimed in claim 1, where the first digital data set (20) represents a first audio signal, the second digital data set (30) represents a second audio signal and the third digital data set (40) represents a third audio signal being a combination of the first audio signal and the second audio signal.

3. A method as claimed in claim 2, where a fourth digital data set representing a fourth audio signal is combined with the first (20) and second digital data set (30) into the third digital set (40) representing a third audio signal being a combination of the first audio signal, the second audio signal and the fourth audio signal.

4. A method as claimed in claim 1, where the first seed sample is the first sample of the first digital data set and the second seed sample is the second sample of the second digital data set.

5. A method as claimed in claim 1, where the first seed sample ($A_0$) and the second seed sample ($B_1$) are embedded in lower significant bits of the samples ($C_0$, $C_1$, $C_2$, $C_3$, $C_4$, $C_5$, $C_6$, $C_7$, $C_8$, $C_9$) of the third digital data set (40).

6. A method as claimed in claim 1, where a synchronizing pattern (SYNC) is embedded at a position defined relative to a location of the first seed sample ($A_0$).

7. A Method as claimed in claim 1, where, previous to the step of equating samples, an error, resulting from the equation of the sample, is approximated by selecting an error approximation from a set of error approximations.

8. A method as claimed in claim 7, where the set of error approximations is indexed and an index representing the error approximation is embedded in an auxiliary data area (81) formed by lower significant bits of the samples to which the error approximation correspond.

9. A method as claimed in claim 7, where the set of error approximations is indexed and an index representing the error approximation is embedded in a data block in an auxiliary data area (81) formed by lower significant bits of samples, the data block preceding the samples to which the index corresponds.

10. A method as claimed in claim 9, where the samples are divided in blocks and the index is embedded in the samples in a first block preceding a second block comprising the samples to which the index corresponds.

11. A method as claimed in claim 9, where the embedded error approximations values are compressed.

12. A method as claimed in claim 11, where the error values are embedded at a first available position with a varying position relative to the samples to which the error values correspond.

13. A method as claimed in claim 1, where any lower significant bits of the samples of the third digital data set not used for embedding are set to a predefined value or set to zero.

14. A method as claimed in claim 5, where the least significant bits are further used to embed control data.

15. A method as claimed in claim 14, where the control data is embedded to control musical instrument.

16. A method as claimed in claim 14, where the control data is embedded to control a light emitting device.

17. A method as claimed in claim 14, where the control data represents one or more gain factors to be applied to the second digital data set (30) during encoding or decoding.

18. A method as claimed in claim 14, where the control data is embedded to control mechanical actuators.

19. A method for extracting a first digital data set (20) of samples ($A_0$, $A_1$, $A_2$, $A_3$, $A_4$, $A_5$, $A_6$, $A_7$, $A_8$, $A_9$) and a second digital data set 30 of samples ($B_0$, $B_1$, $B_2$, $B_3$, $B_4$, $B_5$, $B_6$, $B_7$, $B_8$, $B_9$) from a third digital data set (40) of samples ($C_0$, $C_1$, $C_2$, $C_3$, $C_4$, $C_5$, $C_6$, $C_7$, $C_8$, $C_9$) as obtained by the method of claim 1, comprising the steps of:

retrieving a first seed sample ($A_0$) of the first digital data set (20) and a second seed sample ($B_1$) of the second digital data set (30) from the third digital data set (40), retrieving the first digital data set (20) comprising a first subset of samples ($A_1$, $A_3$, $A_5$, $A_7$, $A_9$) and a second subset of samples ($A_0$, $A_2$, $A_4$, $A_6$, $A_8$) and the second digital data set (30) comprising a third subset of samples ($B_0$, $B_2$, $B_4$, $B_6$, $B_8$) and a fourth subset of samples ($B_1$, $B_3$, $B_5$, $B_7$, $B_9$), by extracting a sample ($B_n$) of the second digital data (30) set by subtracting a known value of a sample of the first digital data set (20) from corresponding a sample of the third digital data set (40) and extracting a sample of the first digital data set (20) by subtracting a known value of a sample of the second digital data set (30) from a corresponding sample of the third digital data set (31), where the samples of the fourth subset ($B_1$, $B_3$, $B_5$, $B_7$, $B_9$) and the second subset of samples ($A_0$, $A_2$, $A_4$, $A_6$, $A_8$) have no samples corresponding in time, where the first subset of samples ($A_1$, $A_3$, $A_5$, $A_7$, $A_9$) have a value equal to neighboring samples of the second subset of samples ($A_0$, $A_2$, $A_4$, $A_6$, $A_8$), where the first subset of samples ($A_1$, $A_3$, $A_5$, $A_7$, $A_9$) and the second subset of samples ($A_0$, $A_2$, $A_4$, $A_6$, $A_8$) are interleaved, where the third subset of samples ($B_0$, $B_2$, $B_4$, $B_6$, $B_8$) have a value equal to neighboring samples of the fourth subset of samples ($B_1$, $B_3$, $B_5$, $B_7$, $B_9$), and where the third subset of samples ($B_0$, $B_2$, $B_4$, $B_6$, $B_8$) and the fourth subset of samples ($B_1$, $B_3$, $B_5$, $B_7$, $B_9$) are interleaved.

20. A method as claimed in claim 19, where the first digital data set (20) represents a first audio signal, the second digital data set (30) represents a second audio signal and the third digital data set (31) represents a third audio signal being a combination of the first audio signal and the second audio signal.

21. A method as claimed in claim 20, where a fourth digital data set representing a fourth audio signal is extracted that was combined with the first and second digital data (20, 30) set into the third digital set (31) representing a third audio signal being a combination of the first audio signal, the second audio signal and the fourth audio signal.

22. A method as claimed in claim 19, where the first seed sample is the first sample ($A_0$) of the first digital data set and the second seed sample ($B_1$) is the second sample of the second digital data set.

23. A method as claimed in claim 19, where the first seed sample ($A_0$) and the second seed sample ($B_1$) are extracted from lower significant bits of the samples ($C_0$, $C_1$, $C_2$, $C_3$, $C_4$, $C_5$, $C_6$, $C_7$, $C_8$, $C_9$) of the third digital data set (40).

24. A method as claimed in claim 19, where a synchronizing pattern (SYNC) is used to define a position of the first seed sample ($A_0$).

25. A Method as claimed in claim 19, where, following the step of retrieving the first digital data set, an error, resulting from the equation of the sample during encoding, is compensated by adding a retrieved error approximation.

26. A method as claimed in claim 25, where the error approximations are retrieved from an auxiliary data area (81) formed by lower significant bits of the samples of the third digital data set.

27. A method as claimed in claim 26, where the auxiliary data area (81) is divided in blocks and error approximations are embedded in a block of the auxiliary data area (81) preceding the samples to which the error approximations corresponds.

28. A method as claimed in claim 25, where the embedded error values are compressed.

29. A method as claimed in claim 25, where the set of error approximations is represented by an index representing the error approximation.

30. A method as claimed in claim 25, where the error values are retrieved from a first available position with a varying position relative to the samples to which the error values correspond.

31. A method as claimed in claim 23, where auxiliary control data is retrieved from the lower significant bits.

32. A method as claimed in claim 31, where the auxiliary control data is provided to control a musical instrument.

33. A method as claimed in claim 31, where the auxiliary control data is provided to control a light emitting device or mechanical actuator.

34. A method as claimed in claim 31, where the auxiliary control data represents one or more gain factors to be applied to the first digital data set.

35. An encoder (10) arranged to execute the method as claimed in claim 1, comprising:

a first equating means (11*a*) to equate a first subset of samples ($A_1$, $A_3$, $A_5$, $A_7$, $A_9$) of the first digital data set (20) to neighboring samples of a second subset of samples ($A_0$, $A_2$, $A_4$, $A_6$, $A_8$) of the first digital data set (20) where the first subset of samples ($A_1$, $A_3$, $A_5$, $A_7$, $A_9$) and the second subset of samples ($A_0$, $A_2$, $A_4$, $A_6$, $A_8$) are interleaved, a second equating means (11*b*) to equate a third subset of samples ($B_0$, $B_2$, $B_4$, $B_6$, $B_8$) of the second digital data set (30) to neighboring samples of a fourth subset of samples ($B_1$, $B_3$, $B_5$, $B_7$, $B_9$) of the second digital data set (30) where the third subset of samples ($B_0$, $B_2$, $B_4$, $B_6$, $B_8$) and the fourth subset of samples ($B_1$, $B_3$, $B_5$, $B_7$, $B_9$) are interleaved, where the fourth subset of samples ($B_1$, $B_3$, $B_5$, $B_7$, $B_9$) and the second subset of samples ($A_0$, $A_2$, $A_4$, $A_6$, $A_8$) have no samples corresponding in time, an combiner (13) for creating the samples of the third digital data set by adding the samples of the first digital data set to the in the time domain corresponding samples of the second digital data set, and a formatting means (14) for embedding a first seed sample of the first digital data set and a second seed sample of the second digital data set in the third digital data set.

36. A digital signal processing device comprising an encoder (10) as claimed in claim 35.

37. A digital signal processing device as claimed in claim 36 where the digital signal processing device is adapted to record multi channel audio.

38. A digital signal processing device as claimed in claim 37 where the digital signal processing device is adapted to record 3 dimensional audio having a first number of audio channels and store the recorded 3 dimensional audio in a format designed for 2 dimensional audio having a second number of audio channels being lower than the first number of audio channels.

39. A decoder arranged to execute the method as claimed in claim 19, comprising:

a seed value retriever 202 for retrieving a first seed sample $A_0$ of the first digital data set (20) and a second seed sample ($B_1$) of the second digital data set (30) from the third digital data set (40), a processor 206 for retrieving the first digital data set (20) comprising a first subset of samples ($A_1$, $A_3$, $A_5$, $A_7$, $A_9$) and a second subset of samples ($A_0$, $A_2$, $A_4$, $A_6$, $A_8$) and the second digital data set (30) comprising a third subset of samples ($B_0$, $B_2$, $B_4$, $B_6$, $B_8$) and a fourth subset of samples ($B_1$, $B_3$, $B_5$, $B_7$, $B_9$), the first processing means comprising an first extractor for extracting a sample Bn of the second digital data (30) set and a first subtractor for subtracting a known value of a sample of the first digital data set (20) from corresponding a sample of the third digital data set (40), the processor further comprising a second extractor for extracting a sample of the first digital data set (20) and a second subtractor for subtracting a known value of a sample of the second digital data set (30) from a corresponding sample of the third digital data set (31), where the samples of the fourth subset ($B_1$, $B_3$, $B_5$, $B_7$, $B_9$) and the second subset of samples ($A_0$, $A_2$, $A_4$, $A_6$, $A_8$) have no samples corresponding in time, where the first subset of samples ($A_1$, $A_3$, $A_5$, $A_7$, $A_9$) have a value equal to neighboring samples of the second subset of samples ($A_0$, $A_2$, $A_4$, $A_6$, $A_8$), where the first subset of samples ($A_1$, $A_3$, $A_5$, $A_7$, $A_9$) and the second subset of samples ($A_0$, $A_2$, $A_4$, $A_6$, $A_8$) are interleaved, where the third subset of samples ($B_0$, $B_2$, $B_4$, $B_6$, $B_8$) have a value equal to neighboring samples of the fourth subset of samples ($B_1$, $B_3$, $B_5$, $B_7$, $B_9$), and where the third subset of samples ($B_0$, $B_2$, $B_4$, $B_6$, $B_8$) and the fourth subset of samples ($B_1$, $B_3$, $B_5$, $B_7$, $B_9$) are interleaved, and output means for outputting the retrieved first digital data set.

40. A decoder (200) as claimed in claim 39 where the output means are arranged to output a digital data set representing a combination of the digital data sets that were not retrieved from the digital data stream.

41. A reproduction device comprising a decoder 200 as claimed in claim 39.

42. A reproduction device as claimed in claim 41 where the reproduction device is adapted to reproduce multi channel audio.

43. A reproduction device as claimed in claim 42 where the multi channel audio is 3 dimensional audio stored in a format designed for 2 dimensional audio, where the 3 dimensional audio has a first number of audio channels and the 2 dimensional audio has a second number of audio channels being lower than the first number of audio channels.

44. A reproduction device as claimed in claim 42 where the multi channel audio is 2 dimensional audio stored in a format designed for 2 channel audio, where the 2 dimensional audio has a number of audio channels higher than two.

45. A reproduction device as claimed in claim 41, where the reproduction device is switchable between stereo reproduction and multi channel audio reproduction.

46. A vehicle with a passenger compartment comprising a reproduction device as claimed in claim 41, the reproduction equipment comprising a reader for a data carrier with audio information and an amplifier.

47. A vehicle as claimed in claim 46 comprising loudspeakers positioned at different height in the passenger compartment, whereby each loudspeaker is driven by a different audio channel as retrieved by the decoder from the audio information on the data carrier.

48. A vehicle as claimed in claim 47, where at least one loudspeaker is positioned higher than the dashboard.

49. A non-transitory computer readable media comprising a digital data set comprising a combination of first digital data set having samples of a first size with a second digital data set having samples of a second size, the digital data set having a third size which is smaller than a sum of the first and second sizes and being obtained by the method as claimed in claim 1.

50. A non-transitory computer readable media comprising code means for executing the combination a first digital data set having samples with a first size with a second digital data set having samples with a second size to form a third digital data set having samples with a third size which is smaller than the sum of the first and second size, the first digital data set having first and second subsets of samples which are equated to one another, the first and second subsets of samples being interleaved within the first digital data set, the second digital data set having third and fourth subsets of samples which are equated to one another, the third and fourth subsets of samples being interleaved within the second digital data set, the third digital data set having samples created by adding samples of the equated first digital data set, in the time domain, to corresponding samples of the equated second digital set together with embedded first and second seed samples from respective ones of the first and second digital data sets on a computer providing a suitable environment for execution of the code means.

* * * * *